US011263601B2

(12) United States Patent
Britt

(10) Patent No.: US 11,263,601 B2
(45) Date of Patent: *Mar. 1, 2022

(54) ELECTRONIC RECEIPT MANAGER APPARATUSES, METHODS AND SYSTEMS

(71) Applicant: VISA INTERNATIONAL SERVICE ASSOCIATION, San Francisco, CA (US)

(72) Inventor: Juliene P. Britt, San Diego, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 202 days.

This patent is subject to a terminal disclaimer.

(21) Appl. No.: 16/598,927

(22) Filed: Oct. 10, 2019

(65) Prior Publication Data
US 2020/0042956 A1    Feb. 6, 2020

Related U.S. Application Data

(63) Continuation of application No. 15/464,566, filed on Mar. 21, 2017, now Pat. No. 10,489,756, which is a
(Continued)

(51) Int. Cl.
*G06Q 20/20*   (2012.01)
*G06F 16/951*  (2019.01)
(Continued)

(52) U.S. Cl.
CPC ......... *G06Q 20/047* (2020.05); *G06F 16/951* (2019.01); *G06Q 20/20* (2013.01);
(Continued)

(58) Field of Classification Search
CPC .... G06Q 20/047; G06Q 20/20; G06Q 20/327; G06Q 30/06; G06F 16/951
(Continued)

(56) References Cited

U.S. PATENT DOCUMENTS 789,106 A    5/1905  Seymour
5,237,164 A  8/1993  Takada
(Continued)

FOREIGN PATENT DOCUMENTS

CA    2328033 A1 *  6/2002    .......... H04L 67/303
CA    2684434 A1    1/2010
(Continued)

OTHER PUBLICATIONS

Albro, E.N., "Shoeboxed: Manage Paper Receipts Online", PC World, Jan. 2009, vol. 27, Issue 1, p. 24. (Year: 2009).
(Continued)

*Primary Examiner* — Phuong Thao Cao
(74) *Attorney, Agent, or Firm* — Loeb & Loeb LLP

(57) ABSTRACT

The ELECTRONIC RECEIPT MANAGER APPARATUSES, METHODS AND SYSTEMS ("ERM") transforms transaction initiation requests and receipt requests via ERM components into receipt formatting, organization, storage and linkage with transactions. The ERM may be configured to receive a receipt through an interface of a portable device and determine a set of fields for formatting data from the receipt. The ERM may format the data from the receipt to include the set of fields and store the formatted data in a memory element of the portable device.

19 Claims, 22 Drawing Sheets

Related U.S. Application Data continuation of application No. 13/470,026, filed on May 11, 2012, now Pat. No. 9,646,291.

(60) Provisional application No. 61/485,029, filed on May 11, 2011.

(51) Int. Cl.
 *G06Q 20/04* (2012.01)
 *G06Q 30/06* (2012.01)
 *G06Q 20/32* (2012.01)
 *H04L 51/42* (2022.01)

(52) U.S. Cl.
 CPC .......... *G06Q 20/327* (2013.01); *G06Q 30/06* (2013.01); *H04L 51/22* (2013.01)

(58) Field of Classification Search
 USPC ....................................................... 707/769
 See application file for complete search history.

(56) References Cited

U.S. PATENT DOCUMENTS

| | | | |
|---|---|---|---|
| 5,311,594 A | 5/1994 | Penzias | |
| 5,446,890 A | 8/1995 | Renslo | |
| 5,459,656 A | 10/1995 | Fields | |
| 5,510,777 A | 4/1996 | Pilc | |
| 5,521,362 A | 5/1996 | Powers | |
| 5,530,438 A | 6/1996 | Bickham | |
| 5,536,045 A | 7/1996 | Adams | |
| 5,615,110 A | 3/1997 | Wong | |
| 5,615,264 A | 3/1997 | Kazmierczak | |
| 5,649,118 A | 7/1997 | Carlisle | |
| 5,815,657 A | 9/1998 | Williams | |
| 5,850,446 A | 12/1998 | Berger | |
| 5,878,337 A | 3/1999 | Joao | |
| 5,903,830 A | 5/1999 | Joao | |
| 5,943,624 A | 8/1999 | Fox | |
| 5,963,924 A | 10/1999 | Williams | |
| 5,999,937 A * | 12/1999 | Ellard ................... G06F 16/258 |
| 6,064,990 A | 5/2000 | Goldsmith | |
| 6,092,053 A | 7/2000 | Boesch | |
| 6,202,052 B1 | 3/2001 | Miller | |
| 6,202,933 B1 | 3/2001 | Poore | |
| 6,263,447 B1 | 7/2001 | French | |
| 6,267,292 B1 | 7/2001 | Walker | |
| 6,336,099 B1 | 1/2002 | Barnett | |
| 6,473,500 B1 | 10/2002 | Risafi | |
| 6,529,725 B1 | 3/2003 | Joao | |
| 6,535,855 B1 | 3/2003 | Cahill | |
| 6,601,761 B1 | 8/2003 | Katis | |
| 6,735,572 B2 | 5/2004 | Landesmann | |
| 6,853,982 B2 | 2/2005 | Smith | |
| 6,857,073 B2 | 2/2005 | French | |
| 6,873,974 B1 | 3/2005 | Schutzer | |
| 6,898,598 B2 | 5/2005 | Himmel | |
| 6,934,528 B2 | 8/2005 | Loureiro | |
| 6,948,002 B2 * | 9/2005 | Chan ...................... G06Q 30/06 709/246 |
| 6,999,943 B1 | 2/2006 | Johnson | |
| 7,024,383 B1 | 4/2006 | Mancini | |
| 7,028,052 B2 | 4/2006 | Chapman | |
| 7,047,041 B2 | 5/2006 | Vanska | |
| 7,051,002 B2 | 5/2006 | Keresman, III | |
| 7,069,240 B2 | 6/2006 | Spero | |
| 7,089,208 B1 | 8/2006 | Levchin | |
| 7,096,003 B2 | 8/2006 | Joao | |
| 7,111,789 B2 | 9/2006 | Rajasekaran | |
| 7,155,411 B1 | 12/2006 | Blinn | |
| 7,177,848 B2 | 2/2007 | Hogan | |
| 7,194,437 B1 | 3/2007 | Britto | |
| 7,206,847 B1 | 4/2007 | Alberth | |
| 7,212,979 B1 | 5/2007 | Matz | |
| RE39,736 E | 7/2007 | Morrill | |
| 7,268,667 B2 | 9/2007 | Beenau | |
| 7,268,668 B2 | 9/2007 | Beenau | |
| 7,290,704 B1 | 11/2007 | Ball | |
| 7,318,049 B2 | 1/2008 | Iannacci | |
| 7,337,119 B1 | 2/2008 | Geschwender | |
| 7,337,144 B1 | 2/2008 | Blinn | |
| 7,343,149 B2 | 3/2008 | Benco | |
| 7,343,351 B1 | 3/2008 | Bishop | |
| 7,349,885 B2 | 3/2008 | Gangi | |
| 7,356,505 B2 | 4/2008 | March | |
| 7,357,310 B2 | 4/2008 | Calabrese | |
| 7,359,880 B2 | 4/2008 | Abel | |
| 7,373,669 B2 | 5/2008 | Eisen | |
| 7,379,899 B1 | 5/2008 | Junger | |
| 7,392,222 B1 | 6/2008 | Hamilton | |
| 7,395,242 B2 | 7/2008 | Blinn | |
| 7,398,250 B2 | 7/2008 | Blinn | |
| 7,413,113 B1 | 8/2008 | Zhu | |
| 7,450,966 B2 | 11/2008 | Vanska | |
| 7,477,780 B2 | 1/2009 | Boncyk | |
| 7,499,889 B2 | 3/2009 | Golan | |
| 7,500,607 B2 | 3/2009 | Williams | |
| 7,533,064 B1 | 5/2009 | Boesch | |
| 7,536,360 B2 | 5/2009 | Stolfo | |
| 7,571,139 B1 | 8/2009 | Giordano | |
| 7,571,140 B2 | 8/2009 | Weichert | |
| 7,593,858 B2 | 9/2009 | Matz | |
| 7,603,311 B1 | 10/2009 | Yadav-ranjan | |
| 7,630,937 B1 | 12/2009 | Mo | |
| 7,634,295 B2 | 12/2009 | Hayaashi | |
| 7,644,037 B1 | 1/2010 | Ostrovsky | |
| 7,644,859 B1 | 1/2010 | Zhu | |
| 7,660,749 B2 | 2/2010 | Koski | |
| 7,676,434 B2 | 3/2010 | Evans | |
| 7,685,067 B1 | 3/2010 | Britto | |
| 7,698,221 B2 | 4/2010 | Blinn | |
| 7,707,113 B1 | 4/2010 | Dimartino | |
| 7,708,194 B2 | 5/2010 | Vawter | |
| 7,708,198 B2 | 5/2010 | Gangi | |
| 7,712,658 B2 | 5/2010 | Gangi | |
| 7,725,369 B2 | 5/2010 | Shiftan | |
| 7,739,194 B2 | 6/2010 | Blinn | |
| 7,742,984 B2 | 6/2010 | Mohsenzadeh | |
| 7,774,076 B2 | 8/2010 | Skowronek | |
| 7,783,569 B2 | 8/2010 | Abel | |
| 7,784,684 B2 | 8/2010 | Labrou | |
| 7,797,625 B1 * | 9/2010 | Wallar, II .............. G06F 40/117 715/249 |
| 7,801,829 B2 | 9/2010 | Gray | |
| 7,802,719 B2 | 9/2010 | Johnson | |
| 7,810,720 B2 | 10/2010 | Lovett | |
| 7,819,307 B2 | 10/2010 | Lyons | |
| 7,828,206 B2 | 11/2010 | Hessburg | |
| 7,828,992 B2 | 11/2010 | Kilickiran | |
| 7,837,125 B2 | 11/2010 | Biskupski | |
| 7,844,530 B2 | 11/2010 | Ziade | |
| 7,849,014 B2 | 12/2010 | Erikson | |
| 7,870,027 B1 | 1/2011 | Tannenbaum | |
| 7,877,299 B2 | 1/2011 | Bui | |
| 7,878,400 B2 | 2/2011 | Harris | |
| 7,890,370 B2 | 2/2011 | Whitsitt | |
| 7,895,119 B2 | 2/2011 | Praisner | |
| 7,899,744 B2 | 3/2011 | Bishop | |
| 7,904,360 B2 | 3/2011 | Evans | |
| 7,908,227 B2 | 3/2011 | Zizzimopoulos | |
| 7,926,714 B1 | 4/2011 | Zhu | |
| 7,933,779 B2 | 4/2011 | Rooks | |
| 7,942,337 B2 | 5/2011 | Jain | |
| 7,962,418 B1 | 6/2011 | Wei | |
| 7,967,196 B1 | 6/2011 | Bierbaum | |
| 7,971,782 B1 | 7/2011 | Shams | |
| 7,996,259 B1 | 8/2011 | Distefano, III | |
| 8,009,334 B2 | 8/2011 | Pandipati | |
| 8,016,192 B2 | 9/2011 | Messerges | |
| 8,020,763 B1 | 9/2011 | Kowalchyk | |
| 8,024,260 B1 | 9/2011 | Hogl | |
| 8,028,041 B2 | 9/2011 | Olliphant | |
| 8,032,438 B1 | 10/2011 | Barton | |
| 8,041,338 B2 | 10/2011 | Chen | |
| 8,050,997 B1 | 11/2011 | Nosek | |

(56) References Cited

U.S. PATENT DOCUMENTS

| | | |
|---|---|---|
| 8,060,413 B2 | 11/2011 | Castell |
| 8,074,876 B2 | 12/2011 | Foss |
| 8,095,439 B1 | 1/2012 | Harman |
| 8,108,261 B2 | 1/2012 | Carlier |
| 8,127,982 B1 | 3/2012 | Casey |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,175,235 B2 | 5/2012 | Mumford |
| 8,175,965 B2 | 5/2012 | Moore |
| 8,175,967 B2 | 5/2012 | OLeary |
| 8,175,968 B2 | 5/2012 | OLeary |
| 8,175,975 B2 | 5/2012 | Cai |
| 8,175,979 B2 | 5/2012 | Baentsch |
| 8,176,416 B1 | 5/2012 | Williams |
| 8,179,563 B2 | 5/2012 | King |
| 8,180,289 B1 | 5/2012 | Glickman |
| 8,180,705 B2 | 5/2012 | Kowalchyk |
| 8,190,513 B2 | 5/2012 | Felger |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,200,582 B1 | 6/2012 | Zhu |
| 8,204,774 B2 | 6/2012 | Chwast |
| 8,204,829 B2 | 6/2012 | Alvarez |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,488 B2 | 8/2012 | Allen |
| 8,244,580 B2 | 8/2012 | Mankoff |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,275,704 B2 | 9/2012 | Bishop |
| 8,280,777 B2 | 10/2012 | Mengerink |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,380,177 B2 | 2/2013 | Laracey |
| 8,392,258 B2 | 3/2013 | Kurihara |
| 8,401,904 B1 | 3/2013 | Simakov |
| 8,412,586 B1 | 4/2013 | Foulser |
| 8,412,630 B2 | 4/2013 | Ross |
| 8,417,633 B1 | 4/2013 | Chmara |
| 8,423,462 B1 | 4/2013 | Amacker |
| 8,643,68 B2 | 2/2014 | Shapiro |
| 9,141,933 B2 * | 9/2015 | Xiang ............... G06F 16/9535 |
| 2001/0037297 A1 | 3/2001 | McNair |
| 2001/0029484 A1 | 10/2001 | Schultz |
| 2001/0056359 A1 | 12/2001 | Abreu |
| 2002/0040325 A1 | 4/2002 | Takae |
| 2002/0077976 A1 | 6/2002 | Meyer |
| 2002/0084320 A1 | 7/2002 | Hoffman |
| 2002/0107755 A1 | 8/2002 | Steed |
| 2002/0112014 A1 | 8/2002 | Bennett |
| 2002/0116271 A1 | 8/2002 | Mankoff |
| 2002/0143614 A1 | 10/2002 | MacLean |
| 2002/0161721 A1 | 10/2002 | Yuan |

(56) References Cited

U.S. PATENT DOCUMENTS

| | | |
|---|---|---|
| 2002/0188559 A1 | 12/2002 | Schultz |
| 2002/0188561 A1 | 12/2002 | Schultz |
| 2003/0014307 A1 | 1/2003 | Heng |
| 2003/0026404 A1 | 2/2003 | Joyce |
| 2003/0028481 A1 | 2/2003 | Flitcroft |
| 2003/0033272 A1 | 2/2003 | Himmel |
| 2003/0080185 A1 | 5/2003 | Werther |
| 2003/0097318 A1 | 5/2003 | Yu |
| 2003/0101134 A1 | 5/2003 | Liu |
| 2003/0105680 A1 | 6/2003 | Song |
| 2003/0174823 A1 | 9/2003 | Justice |
| 2003/0177361 A1 | 9/2003 | Wheeler |
| 2003/0191711 A1 | 10/2003 | Jamison |
| 2003/0200142 A1 | 10/2003 | Hicks |
| 2003/0200184 A1 | 10/2003 | Dominguez |
| 2003/0212642 A1 | 11/2003 | Weller |
| 2004/0054984 A1 | 3/2004 | Chong |
| 2004/0059440 A1 | 3/2004 | Renner |
| 2004/0064373 A1 | 4/2004 | Shannon |
| 2004/0078282 A1 | 4/2004 | Robinson |
| 2004/0078332 A1 | 4/2004 | Ferguson |
| 2004/0103037 A1 | 5/2004 | Wetmore |
| 2004/0128197 A1 | 7/2004 | Bam |
| 2004/0138999 A1 | 7/2004 | Friedman |
| 2004/0143450 A1* | 7/2004 | Vidali .................. G06Q 40/025 705/38 |
| 2004/0148255 A1 | 7/2004 | Beck |
| 2004/0215963 A1 | 10/2004 | Kaplan |
| 2004/0220964 A1 | 11/2004 | Shiftan |
| 2004/0230536 A1 | 11/2004 | Fung |
| 2004/0236646 A1 | 11/2004 | Wu |
| 2004/0254891 A1 | 12/2004 | Blinn |
| 2004/0267608 A1 | 12/2004 | Mansfield |
| 2005/0010483 A1 | 1/2005 | Ling |
| 2005/0037735 A1 | 2/2005 | Courts |
| 2005/0049928 A1 | 3/2005 | Naick |
| 2005/0060437 A1 | 3/2005 | Doyle |
| 2005/0065819 A1 | 3/2005 | Pamela |
| 2005/0080747 A1 | 4/2005 | Anderson |
| 2005/0080821 A1 | 4/2005 | Breil |
| 2005/0097320 A1 | 5/2005 | Golan |
| 2005/0137969 A1 | 6/2005 | Shah |
| 2005/0170845 A1 | 8/2005 | Moran |
| 2005/0171894 A1 | 8/2005 | Traynor |
| 2005/0192893 A1 | 9/2005 | Keeling |
| 2005/0192895 A1 | 9/2005 | Rogers |
| 2005/0220326 A1 | 10/2005 | Sim |
| 2005/0222944 A1 | 10/2005 | Dodson |
| 2005/0234817 A1 | 10/2005 | VanFleet |
| 2005/0240482 A1 | 10/2005 | Ohkawa |
| 2005/0246278 A1 | 11/2005 | Gerber |
| 2005/0254714 A1 | 11/2005 | Anne |
| 2005/0261967 A1 | 11/2005 | Barry |
| 2006/0053056 A1 | 3/2006 | Alspach-goss |
| 2006/0085328 A1 | 4/2006 | Cohen |
| 2006/0085477 A1 | 4/2006 | Phillips |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano |
| 2006/0190347 A1 | 8/2006 | Cuervo |
| 2006/0226216 A1 | 10/2006 | Keithley |
| 2006/0277143 A1 | 12/2006 | Almonte |
| 2006/0293947 A1 | 12/2006 | Nicholson |
| 2007/0011025 A1 | 1/2007 | Cracchiolo |
| 2007/0038515 A1 | 2/2007 | Postrel |
| 2007/0038516 A1 | 2/2007 | Apple |
| 2007/0055571 A1 | 3/2007 | Fox |
| 2007/0087820 A1 | 4/2007 | Van |
| 2007/0094066 A1 | 4/2007 | Kumar |
| 2007/0100691 A1 | 5/2007 | Patterson |
| 2007/0100728 A1 | 5/2007 | Rotman |
| 2007/0106607 A1 | 5/2007 | Seib |
| 2007/0113289 A1 | 5/2007 | Blumenau |
| 2007/0143204 A1 | 6/2007 | Claus |
| 2007/0150413 A1 | 6/2007 | Morgenstern |
| 2007/0164106 A1 | 7/2007 | McDevitt |
| 2007/0180119 A1 | 8/2007 | Khivesara |
| 2007/0208662 A1 | 9/2007 | Jeronimus |
| 2007/0214078 A1 | 9/2007 | Coppinger |
| 2007/0214250 A1 | 9/2007 | Ahmed |
| 2007/0219960 A1 | 9/2007 | Vadon |
| 2007/0226152 A1 | 9/2007 | Jones |
| 2007/0233590 A1 | 10/2007 | Hardison |
| 2007/0239502 A1 | 10/2007 | Babu |
| 2007/0276765 A1 | 11/2007 | Hazel |
| 2007/0299709 A1* | 12/2007 | Harrell .................. G06Q 10/06 705/7.41 |
| 2008/0004116 A1 | 1/2008 | Van |
| 2008/0004952 A1 | 1/2008 | Koli |
| 2008/0010096 A1 | 1/2008 | Patterson |
| 2008/0021829 A1 | 1/2008 | Kranzley |
| 2008/0028473 A1 | 1/2008 | Cehelnik |
| 2008/0077489 A1 | 3/2008 | Gilley |
| 2008/0078282 A1 | 4/2008 | Saijo |
| 2008/0086365 A1 | 4/2008 | Zollino |
| 2008/0091553 A1 | 4/2008 | Koski |
| 2008/0091616 A1 | 4/2008 | Helwin |
| 2008/0097856 A1 | 4/2008 | Blagg |
| 2008/0114737 A1 | 5/2008 | Neely |
| 2008/0126145 A1 | 5/2008 | Racklet, III |
| 2008/0133351 A1 | 6/2008 | White |
| 2008/0140568 A1 | 6/2008 | Henry |
| 2008/0147883 A1 | 6/2008 | Philyaw |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0223918 A1 | 9/2008 | Williams |
| 2008/0231451 A1 | 9/2008 | Kamel |
| 2008/0270300 A1 | 10/2008 | Jones |
| 2008/0270567 A1* | 10/2008 | Stiers .................. H04L 67/108 709/217 |
| 2008/0272188 A1 | 11/2008 | Keithley |
| 2008/0313066 A1 | 12/2008 | Sholtis |
| 2008/0319905 A1 | 12/2008 | Carlson |
| 2009/0006181 A1 | 1/2009 | Ghosh |
| 2009/0024527 A1 | 1/2009 | Sellen |
| 2009/0037255 A1 | 2/2009 | Chiu |
| 2009/0044258 A1* | 2/2009 | Zhong .................. H04W 12/06 726/4 |
| 2009/0048934 A1 | 2/2009 | Haddad |
| 2009/0061884 A1 | 3/2009 | Rajan |
| 2009/0063261 A1 | 3/2009 | Scribner |
| 2009/0064056 A1 | 3/2009 | Anderson |
| 2009/0076953 A1 | 3/2009 | Saville |
| 2009/0076966 A1 | 3/2009 | Bishop |
| 2009/0089176 A1 | 4/2009 | Mccabe |
| 2009/0089193 A1 | 4/2009 | Paintin |
| 2009/0089194 A1 | 4/2009 | Mathis |
| 2009/0104888 A1 | 4/2009 | Cox |
| 2009/0106151 A1 | 4/2009 | Nelsen |
| 2009/0119176 A1 | 5/2009 | Johnson |
| 2009/0119211 A1 | 5/2009 | Johnson |
| 2009/0119278 A1 | 5/2009 | Cross |
| 2009/0132347 A1 | 5/2009 | Anderson |
| 2009/0132395 A1 | 5/2009 | Lam |
| 2009/0144104 A1 | 6/2009 | Johnson |
| 2009/0157802 A1* | 6/2009 | Kang .................. G06F 16/275 709/203 |
| 2009/0164344 A1 | 6/2009 | Shiftan |
| 2009/0171778 A1 | 7/2009 | Powell |
| 2009/0182664 A1 | 7/2009 | Trombley |
| 2009/0192817 A1* | 7/2009 | Shiftan .............. G06Q 30/0601 705/1.1 |
| 2009/0210300 A1 | 8/2009 | Cansler |
| 2009/0222347 A1 | 9/2009 | Whitten |
| 2009/0233579 A1 | 9/2009 | Castell |
| 2009/0234751 A1 | 9/2009 | Chan |
| 2009/0241159 A1 | 9/2009 | Campagna |
| 2009/0254471 A1 | 10/2009 | Seidel |
| 2009/0254479 A1 | 10/2009 | Pharris |

(56) References Cited

U.S. PATENT DOCUMENTS

| | | |
|---|---|---|
| 2009/0254535 A1 | 10/2009 | Eickelmann |
| 2009/0265274 A1 | 10/2009 | Hahn-Carlson |
| 2009/0271265 A1* | 10/2009 | Lay .................... G06Q 20/047 705/14.38 |
| 2009/0271322 A1 | 10/2009 | Lay |
| 2009/0288012 A1 | 11/2009 | Hertel |
| 2009/0307135 A1 | 12/2009 | Gupta |
| 2009/0313132 A1 | 12/2009 | McKenna |
| 2009/0327045 A1 | 12/2009 | Olives |
| 2009/0327088 A1 | 12/2009 | Puthupparambil |
| 2010/0004989 A1 | 1/2010 | Bonalle |
| 2010/0005025 A1 | 1/2010 | Kumar |
| 2010/0009663 A1 | 1/2010 | Chang |
| 2010/0010964 A1 | 1/2010 | Skowronek |
| 2010/0023386 A1 | 1/2010 | Avisar |
| 2010/0023455 A1 | 1/2010 | Dispensa |
| 2010/0036741 A1 | 2/2010 | Cleven |
| 2010/0036775 A1 | 2/2010 | Edens |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0063903 A1 | 3/2010 | Whipple |
| 2010/0076873 A1 | 3/2010 | Taylor |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0094730 A1 | 4/2010 | Koski |
| 2010/0100434 A1 | 4/2010 | Sock |
| 2010/0100480 A1 | 4/2010 | Altman |
| 2010/0121707 A1 | 5/2010 | Goeldi |
| 2010/0125492 A1 | 5/2010 | Lin |
| 2010/0125495 A1 | 5/2010 | Smith |
| 2010/0125803 A1 | 5/2010 | Johnson |
| 2010/0131347 A1 | 5/2010 | Sarptipi |
| 2010/0131415 A1 | 5/2010 | Sartipi |
| 2010/0155470 A1 | 6/2010 | Woronec |
| 2010/0161433 A1 | 6/2010 | White |
| 2010/0174599 A1 | 7/2010 | Rosenblatt |
| 2010/0180223 A1* | 7/2010 | Speier ................... G06F 16/34 715/771 |
| 2010/0185505 A1 | 7/2010 | Sprogoe |
| 2010/0185531 A1 | 7/2010 | Van |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D |
| 2010/0211499 A1 | 8/2010 | Zanzot |
| 2010/0217682 A1 | 8/2010 | Chan |
| 2010/0218092 A1 | 8/2010 | Xiang |
| 2010/0250351 A1 | 9/2010 | Gillenson |
| 2010/0257066 A1* | 10/2010 | Jones ................... G06Q 20/202 705/17 |
| 2010/0262837 A1 | 10/2010 | Kulin |
| 2010/0274685 A1 | 10/2010 | Kurihara |
| 2010/0276484 A1 | 11/2010 | Banerjee |
| 2010/0305848 A1 | 12/2010 | Stallman |
| 2010/0306075 A1 | 12/2010 | Drance |
| 2010/0306080 A1 | 12/2010 | Trandal |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0332262 A1 | 12/2010 | Horvitz |
| 2010/0332265 A1 | 12/2010 | Smith |
| 2010/0332283 A1 | 12/2010 | Ng |
| 2011/0047075 A1 | 2/2011 | Fourez |
| 2011/0078082 A1 | 3/2011 | Gupta |
| 2011/0082789 A1 | 4/2011 | Boyd |
| 2011/0087672 A1* | 4/2011 | Hui ..................... G06F 16/951 707/748 |
| 2011/0099057 A1 | 4/2011 | Tenyer |
| 2011/0099073 A1 | 4/2011 | Yigit |
| 2011/0105183 A1 | 5/2011 | Hsiao |
| 2011/0106698 A1 | 5/2011 | Issacson |
| 2011/0106714 A1 | 5/2011 | Junger |
| 2011/0107264 A1 | 5/2011 | Akella |
| 2011/0125598 A1* | 5/2011 | Shin ................... G06Q 20/3278 705/17 |
| 2011/0137742 A1 | 6/2011 | Parikh |
| 2011/0145148 A1* | 6/2011 | Hammad ............ G06Q 20/405 705/44 |
| 2011/0178896 A1 | 7/2011 | Nakajima |
| 2011/0184822 A1 | 7/2011 | Matkovic |
| 2011/0184827 A1 | 7/2011 | Hubert |
| 2011/0214086 A1 | 9/2011 | Narayanan |
| 2011/0215146 A1 | 9/2011 | Shams |
| 2011/0218870 A1 | 9/2011 | Shams |
| 2011/0246284 A1* | 10/2011 | Chaikin ................. G06Q 30/00 705/14.38 |
| 2011/0246290 A1 | 10/2011 | Howard |
| 2011/0258123 A1 | 10/2011 | Dawkins |
| 2011/0289397 A1* | 11/2011 | Eastmond ............. G06Q 10/10 715/212 |
| 2011/0296508 A1 | 12/2011 | Os |
| 2011/0320344 A1 | 12/2011 | Faith |
| 2012/0005542 A1* | 1/2012 | Petersen ............... G06F 21/552 714/48 |
| 2012/0011063 A1 | 1/2012 | Killian |
| 2012/0022943 A1 | 1/2012 | Howard |
| 2012/0023026 A1 | 1/2012 | Chen |
| 2012/0030101 A1 | 2/2012 | Boyd |
| 2012/0036071 A1 | 2/2012 | Fulton |
| 2012/0078682 A1* | 3/2012 | Pinsley .................. G06Q 40/12 705/7.29 |
| 2012/0084135 A1* | 4/2012 | Nissan .................. G06Q 30/06 705/14.38 |
| 2012/0084204 A1 | 4/2012 | Castell |
| 2012/0084391 A1 | 4/2012 | Patel |
| 2012/0095895 A1 | 4/2012 | Aston |
| 2012/0096367 A1 | 4/2012 | Dellostritto |
| 2012/0101881 A1 | 4/2012 | Taylor |
| 2012/0116966 A1 | 5/2012 | Tan |
| 2012/0118950 A1 | 5/2012 | Belk |
| 2012/0123838 A1 | 5/2012 | Sparks |
| 2012/0136780 A1 | 5/2012 | El-Awady |
| 2012/0158584 A1* | 6/2012 | Behren ................. G06Q 20/209 705/41 |
| 2012/0158654 A1* | 6/2012 | Behren ................. G06Q 30/06 707/626 |
| 2012/0166333 A1 | 6/2012 | von Behren |
| 2012/0173431 A1 | 7/2012 | Ritchie |
| 2012/0190386 A1 | 7/2012 | Anderson |
| 2012/0203644 A1 | 8/2012 | Phillips |
| 2012/0215640 A1 | 8/2012 | Ramer |
| 2012/0215650 A1 | 8/2012 | Oba |
| 2012/0221421 A1 | 8/2012 | Hammad |
| 2012/0221502 A1 | 8/2012 | Jerram |
| 2012/0231844 A1 | 9/2012 | Coppinger |
| 2012/0259763 A1 | 10/2012 | Pessin |
| 2012/0284101 A1 | 11/2012 | Schiller |
| 2012/0290422 A1 | 11/2012 | Bhinder |
| 2012/0290609 A1 | 11/2012 | Britt |
| 2012/0304273 A1 | 11/2012 | Bailey |
| 2012/0310826 A1 | 12/2012 | Chatterjee |
| 2012/0310880 A1* | 12/2012 | Giampaolo ......... G06F 16/2471 707/610 |
| 2012/0323664 A1 | 12/2012 | Klems |
| 2013/0090750 A1 | 4/2013 | Herrman |
| 2013/0167124 A1* | 6/2013 | Amit ................. H04L 29/08981 717/130 |

(56) References Cited

U.S. PATENT DOCUMENTS

FOREIGN PATENT DOCUMENTS

| EP | 0855659 A1 | 7/1998 |
|---|---|---|
| JP | 2008545210 A | 12/2008 |
| KR | 20030065920 A | 5/2004 |
| KR | 20060117177 A | 11/2006 |
| KR | 20070104087 A | 10/2007 |
| WO | 0165502 A2 | 9/2001 |
| WO | 03023674 A1 | 3/2003 |
| WO | 2010148737 A1 | 12/2010 |

OTHER PUBLICATIONS

Andreassen et al., "Security in Cloud Computing: A Security Assessment of Cloud Computing Providers for an Oline Receipt Storage," Norwegian University of Science and Technology, Department of Computer and Information Science, Master of Science in Computer Science, Jun. 2010, 118 pages.
Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.
David Breitkopf, "ACS to Take Over Mich. WC Distribution Program", American Banker, New York, NY: Jul. 20, 2006, vol. 171. Issue 138, p. 6.
Gopalan, NP & Selvan, B Siva. TCP/IP Illustrated. Prentice-Hall. 2008. pp. 101-102, 175-176 and 235. 7 pages.
International Search Report and Writen Opinion for PCT/US09/54921 dated Oct. 21, 2009. (8 pages).
International Search Report and Written Opinion for PCT/US2010/033229 dated Dec. 29, 2010. (8 pages).
International Search Report and Written Opinion for PCT/US11/57173 dated Mar. 15, 2012. (11 pages).
International Search Report and Written Opinion for PCT/US11/57179 dated Jan. 5, 2012. (7 pages).
International Search Report and Written Opinion for PCT/US11/57180 dated Mar. 15, 2012 (11 pages).
International Search Report and Written Opinion for PCT/US12/37597 dated Sep. 21, 2012 (11 pages).
International Search Report and Written Opinion for PCT/US12/41437 dated Aug. 24, 2012. (20 pages).
International Search Report and Written Opinion for PCT/US2010/033861 dated Dec. 9, 2010 (7 pages).
International Search Report and Written Opinion for PCT/US2010/041860 dated Feb. 1, 2011. (8 pages).
International Search Report and Written Opinion for PCT/US2010/046833 dated Apr. 26, 2011 (8 pages).
International Search Report and Written Opinion for PCT/US2010/048344 dated Nov. 15, 2010. (7 pages).
International Search Report and Written Opinion for PCT/US2011/024941 dated Apr. 19, 2011 (6 pages).
International Search Report and Written Opinion for PCT/US2011/032093 dated Aug. 24, 2011 (11 pages).
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report and Written Opinion issued in connection with PCT/US11/42062 dated Sep. 29, 2011 (8 pages).
International Search Report and Writtten Opinion for PCT/US2011/039178 dated Sep. 16, 2011 (7 pages).
International Search Report for PCT/US11/49393 dated Dec. 5, 2011. (2 pages).
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report for PCT/US2011/035268 dated Aug. 5, 2011 (3 pages).
Notice of Allowance dated Jul. 11, 2019 for U.S. Appl. No. 15/464,566 (pp. 1-11).
Office Action dated Mar. 20, 2019 for U.S. Appl. No. 15/464,566 (pp. 1-34).
Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.

* cited by examiner

Exemplary Portable Device

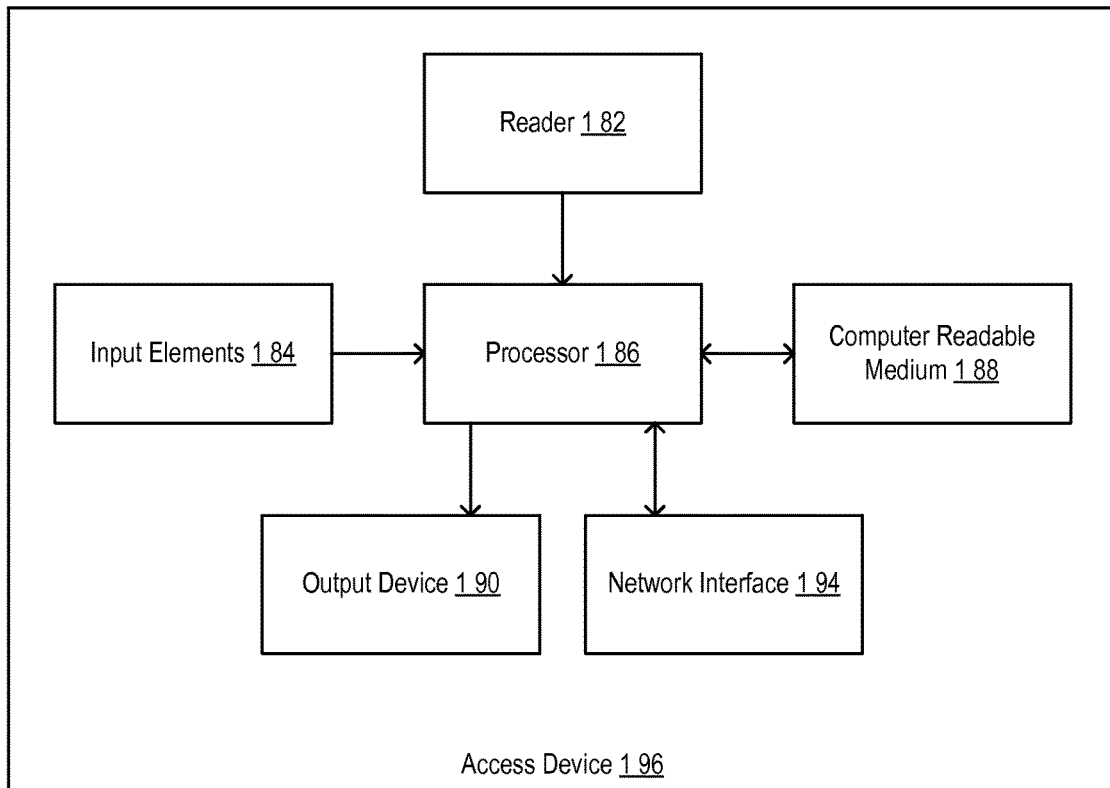
FIGURE 1C — Exemplary Access Device

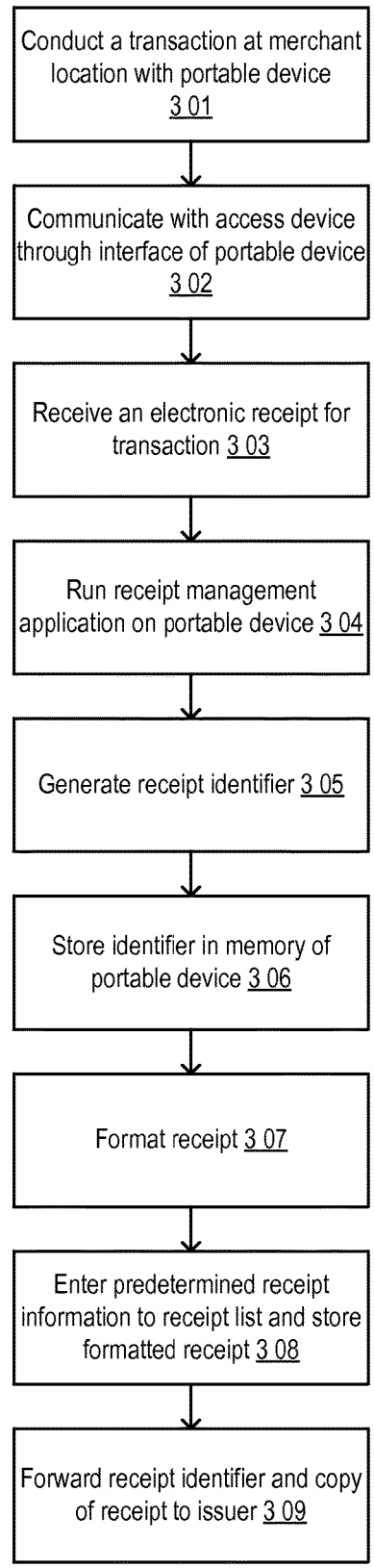
FIGURE 3  Exemplary Receipt Management (RM) Component Logic Flow

FIGURE 7C

FIGURE 7D — Exemplary Electronic Receipt Manager User Interfaces

800

RECEIPT MANAGER

| RECEIPT ID | DATE | AMOUNT | MERCHANT | RETURNS |
|---|---|---|---|---|
| 123 | 01/02/10 | 34.50 | GAP | N/A |
| 456 | 01/23/10 | 98.00 | M KORS | 14 DAYS |
| 789 | 02/04/10 | 3.54 | SBUX | N/A |
| 012 | 02/28/10 | 8.23 | CONVERSE | 30 DAYS |
| 345 | 03/01/10 | 256.21 | MACYS | 30 DAYS |
| 678 | 03/03/10 | 45.98 | BCBG | 60 DAYS |
| 901 | 03/03/10 | 20.00 | CK | 14 DAYS |
| 234 | 03/12/10 | 49.87 | GAP | 7 DAYS |
| 567 | 03/16/10 | 38.77 | IN & OUT | N/A |
| 890 | 03/17/10 | 124.76 | OAKLEY | 30 DAYS |

802

804  806  808  810 EXIT

FIGURE 8A  Exemplary Electronic Receipt Manager User Interfaces 8 05
STARBUCKS
123 NONAME ROAD
CITY, ST 12234
Store No.: 89012344
789
8 12
02/04/10
13:12:14 P
ACCT #   XXXXXXXXX 9000
LG REG COFFEE                                          2.00
DANISH                                                     1.00
         SUBTOTAL                                        3.00
         TAX                                                   0.54
         TOTAL                                                3.54
        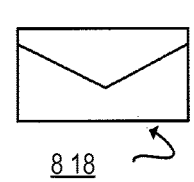    
8 14                   8 16                   8 18                   8 20
FIGURE 8B                                                     Exemplary Original Receipt 8 15

VISA
ACCOUNT ENDING IN x9000

| DESCRIPTION | DATE | DEBITS | CREDITS | BALANCE |
|---|---|---|---|---|
| GAP 01/0210 11:59<br>1234567 CITY, ST 123 | 01/04/10 | 34.50 | | 421.00 |
| M KORS 01/23/10 15:10<br>3454677 CITY, ST 456 | 01/24/10 | 98.00 | | 323.00 |
| SBUX 02/04/10 13:12<br>89012344 CITY, ST 789 | 02/06/10 | 3.54 | | 319.46 |
| ⋮ | ⋮ | ⋮ | ⋮ | ⋮ |

Exemplary User Account Statement

FIGURE 8D

Left panel (8.25) — Recent Activity:

- Back | Visa - 9000 JANE DOE | Pay Bill
- 8.25a
- Columns: Date | Amount | Description (8.25b) ▶ 8.25c

| Date | Amount | Description |
|---|---|---|
| 05/02/20XX | | |
| WHOLEFDS TAN 10327 CITY, STATE | 8.25f $41.22 8.25e | 📄 8.25g |
| 04/29/20XX | | |
| JDREW 5745656 NICE CITY, OR | $550.00 | 📄 |
| SHELL OIL 5745687 CITY, STATE | $56.03 | 📄 |
| 04/28/20XX | | |
| M KORS 567786878 CITY, STATE | $323.00 | 📄 |
| GAP 1223243 CITY STATE | $421.00 | 📄 |
| SBUX 89012344 CITY, STATE | $319.46 | 📄 |

Home | My cards | Contact us | Help

Right panel (8.35) — Recent Activity with receipt popup:

- Back | Visa - 9000 | Pay Bill
- Receipt (8.35a ... 8.35b) ✕

JDREW
700 SW Fifty Ave.
Nice city, OR 97120

STORE: 00506     CASHIER: McKenzie
ASSOCIATE: 0000000999   REGISTER: 003
1: 20 PM 4/29/20XX Rex dress in silk charmeuse   1 @ $550.00
Item No. 57093
Color: Blue Size: 2

Merchandise Total:              $550.00
Sales Tax:                        $0.00
Total:                          $550.00

Visa
Jane Doe
XXXXXXXX9000
R207023274373294820842

8.35c Print | 8.35d Save | 8.35e Email

Home | My cards | Contact us | Help

Exemplary User Account Application User Interfaces

ELECTRONIC RECEIPT MANAGER APPARATUSES, METHODS AND SYSTEMS

PRIORITY CLAIM

This application is a continuation of U.S. patent application Ser. No. 15/464,566 entitled "ELECTRONIC RECEIPT MANAGER APPARATUSES, METHODS AND SYSTEMS." filed Mar. 21, 2017, issued as U.S. Pat. No. 10,489,756, which is a continuation of U.S. patent application Ser. No. 13/470,026 entitled "ELECTRONIC RECEIPT MANAGER APPARATUSES, METHODS AND SYSTEMS," filed May 11, 2012, issued as U.S. Pat. No. 9,646,291, which claims priority to and the benefit of U.S. Provisional Patent Application Ser. No. 61/485,029, entitled "ELECTRONIC RECEIPT MANAGEMENT," filed May 11, 2011, the entire contents of which are incorporated herein by reference.

This application for letters patent discloses and describes various novel innovations and inventive aspects of ELECTRONIC RECEIPT MANAGER technology (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations address apparatuses, methods, and systems for managing, organizing and viewing receipts, and more particularly, include ELECTRONIC RECEIPT MANAGER APPARATUSES, METHODS AND SYSTEMS ("ERM").

BACKGROUND

When a transaction occurs at a merchant location, paper receipts are provided to the consumer as a proof of purchase. Similarly, when a transaction occurs online, an electronic receipt is displayed or e-mailed to the consumer. Some of these receipts may be kept by the consumer, for example, for returning merchandise, while other receipts may be discarded or lost.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIG. 1C shows a block diagram illustrating an exemplary access device in some embodiments of the ERM;

FIG. 3 shows a logic flow diagram illustrating an exemplary receipt management (RM) component in some embodiments of the ERM;

FIGS. 7A-F show screenshot diagrams illustrating exemplary receipt manager application user interfaces in some embodiments of the ERM;

FIG. 8A shows a screenshot diagram illustrating an exemplary receipt manager user interface in some embodiments of the ERM;

FIG. 8B shows a screenshot diagram illustrating an exemplary original receipt in some embodiments of the ERM;

FIG. 8C shows a screenshot diagram illustrating an exemplary user account statement in some embodiments of the ERM;

FIGS. 8D-E show screenshot diagrams illustrating exemplary user account application user interfaces in some embodiments of the ERM.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Various embodiments of the ERM facilitate storage, management, organization, classification and retrieval of electronic receipts. Such receipts may be obtained as paper receipts or electronic receipts from purchases by consumers at point of sale (PoS) terminals or online. Consumers may utilize the facilities of the ERM for various purposes. For example, some consumers may maintain these receipts in order to return items for the price at which the item was originally purchased. Consumers may also maintain a copy of the receipts for tax purposes and personal accounting. In the case of employees, businesses may require all receipts to be collected for expense reports and/or record keeping.

Printing these transaction receipts not only is cumbersome and generates waste, which is harmful to the environment, but also adds additional cost to the merchant to purchase both the paper and machines to print them. In addition, further burden is placed on consumers to retain them. When receipts are lost, consumers can lose money on returns as well as on disputes regarding a refund for a returned purchase. Additionally, if a consumer is viewing an account statement from a bank for example, the consumer must retain a paper receipt in order to identify and verify transaction amounts. Various embodiments of the ERM facilitate management, storage, search, and retrieval of receipts from transactions, whether such transactions are performed in-person or online, and using electronic wallet or other forms of payment.

Electronic Receipt Manager (ERM)

Figure 1A:
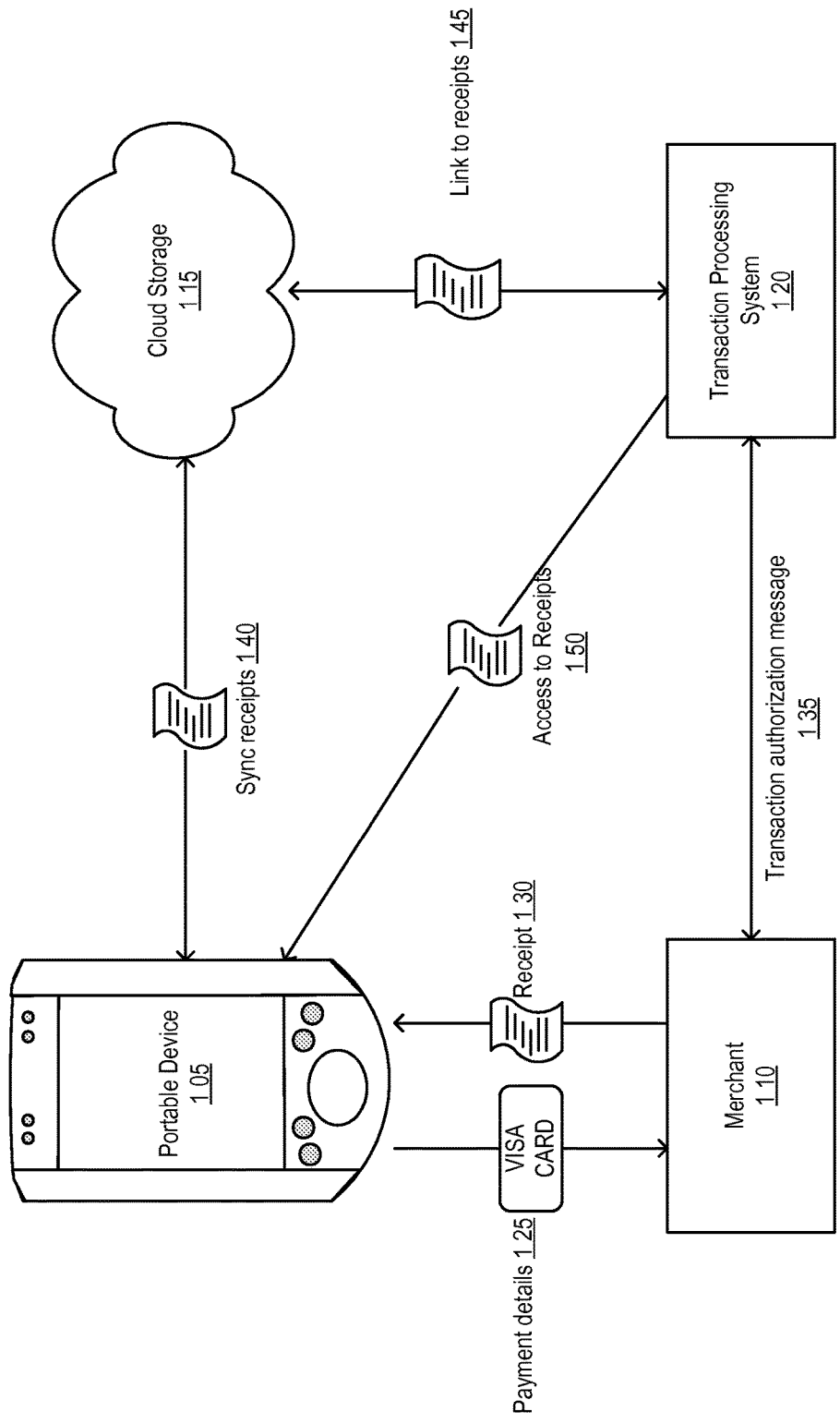
FIG. 1A shows a block diagram illustrating an exemplary receipt storage and access component in some embodiments of the ERM

FIG. 1A shows a block diagram illustrating exemplary receipt storage and access components in some embodiments of the ERM. A user (or a consumer) may use his or her portable device 105 to conduct a transaction with a merchant 110. The transaction may be conducted at a point of sale (PoS) terminal, online, between portable devices, and/or the like. In one implementation, payment details 125 stored in or provided via the portable device 105 may be wirelessly sent to the merchant 110. In other implementations, payment details 125 may be communicated to the merchant 110 using non-wireless methods (e.g., payment card swipe or tap or manual input). The merchant 110 may communicate with a transaction processing system (TPS) 120 to send and receive transaction authorization messages 135. For example, the merchant 110 may send a transaction authorization request message including the user provided payment details 125 and transaction information (e.g., product information, merchant identifier, SKU data, merchant name, transaction amount, and/or the like) to the TPS 120. The TPS 120 may obtain authorization for the transaction, and respond to the merchant 110 with a transaction authorization response message, approving or declining the transaction. If the transaction is authorized, the merchant may provide a receipt 130 for the transaction to the user or directly to the portable device 105. In various embodiments, the TPS 120 may include a transaction handler; an issuer processor (also referred to as issuer or issuing bank); an acquirer processor (also referred to as a acquirer or an acquiring bank); a third-party processor working on behalf of the merchant, TPS, and/or the cloud storage system.

In one embodiment, the portable device 105 may communicate with a cloud storage system 115 that is configured to store electronic receipts for transactions on behalf of the user. The user may configure an account with the cloud storage system, such as upon, prior to, or after installing the receipt manager (RM) application. In one implementation, the cloud storage system may be operated by the TPS. In another implementation, the cloud storage system may be independent of the TPS. The user may use the portable device 105 to sync receipts 140 with his or her account at the cloud storage system 115. Users may sync electronic receipts that are stored locally in their portable device 105 or from email or other storage applications or servers using an ERM application (e.g., RM application) installed in their portable device 105. Users may also capture an image of a paper receipt, and sync the captured receipt with the cloud storage system 115.

In one embodiment, the cloud storage system 115 may provide receipt details (e.g., receipt, receipt identifier, transaction identifying information, and/or the like) to the TPS 120 (e.g., an issuer bank). The TPS 120 may identify a transaction corresponding to each receipt and may link the receipt 145 to the transaction, thereby allowing users access to the receipts 150 directly from their online accounts with the TPS 120.

In some implementations, the ERM may also facilitate receipt management for person-to-person transactions using portable devices. A person-to-person transaction may include, for example, a payment made to a seller in a farmer's market, sites like Craigslist, and/or the like. After the transfer of funds from the user's payment account to the beneficiary, the issuer of the account, the TPS, and/or the like may generate a receipt for the funds transfer transaction, which may be transmitted to the cloud storage system for storage, management and retrieval. In one implementation, the receipt may include information on the sender, the beneficiary, verification identifiers (e.g., from sender bank, receiver bank, TPS, and/or the like), amount, date, time, location, user provided transaction details (e.g., Frank from the pottery shop in a market), and/or the like.

Figure 1B:
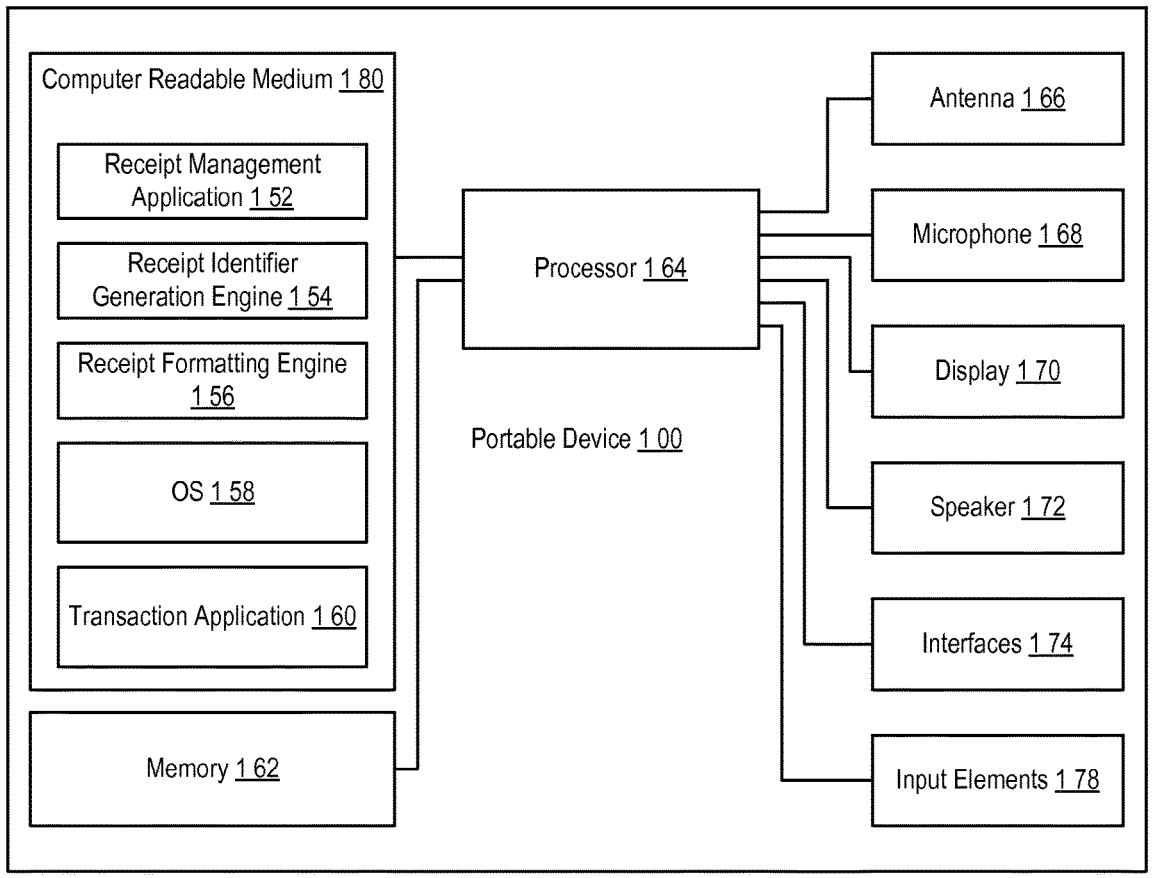
FIG. 1B shows a block diagram illustrating an exemplary portable device in some embodiments of the ERM.

FIG. 1B shows a block diagram illustrating an exemplary portable device in some embodiments oft the ERM. As shown in FIG. 1B, a portable device 100 may be in the form of a cellular phone, smart phone, tablet, personal digital assistant, and/or the like. The portable device 100 may have a display 170 and input elements 178 (e.g., keyboard) to allow a user to input information into the device memory 162. The portable device 100 may also include a processor 164 (e.g., a microprocessor) for processing the instructions stored or received, at least one antenna 166 for wireless data transfer, a microphone 168 to allow the user to transmit his or her voice through the device 100, and a speaker 172 to allow the user to hear voice communication, music, etc. In addition, the portable device 100 may include one or more interfaces in addition to the antenna 166, such as a contact or contactless interface for transferring information through direct contact or through an integrated chip, which may be coupled to the antenna. The interfaces 174 may provide a near field communication interface (e.g., contactless interface, Bluetooth, optical interface, etc.) and/or wireless communications interfaces capable of communicating through a cellular network, such as Global System for Mobile Communication (GSM), or through WiFi, such as with a wireless local area network (WLAN). Accordingly, the portable device may be capable of transmitting and receiving information wirelessly through short range and long range communication protocols. In the embodiment shown in FIG. 1B, an antenna 166 may comprise a cellular antenna (e.g., for sending and receiving cellular voice and data communication, such as through a wireless network), and interfaces 174 may comprise more local communication, such as for use in conducting transactions. In other embodiments contemplated herein, communication with the portable device 100 may be conducted with a single antenna configured for multiple purposes (e.g., cellular, transactions, and/or the like), or with further interfaces (e.g., 3, 4, or more separate interfaces).

The portable device 100 may also include a computer readable medium 180 coupled to the processor 164, which stores application programs and other computer code instructions for operating the portable device 100, such as an operating system (OS) 158. In one embodiment of the ERM, the computer readable medium 180 may include a receipt manager (RM) application 152. In some implementations, the RM application 152 may automatically run each time that an electronic receipt is received, such as during communication with an access device illustrated in FIG. 1C. In some embodiments, the RM application 152 may run continuously (e.g., in the background) or when launched by a trigger (e.g., transaction occurrence, user input, application launch, and/or the like). In addition, the application may include a customizable user interface (UI), which may be configured by the user's preferences through application level programming. The application may be used to display and manage the electronic receipts for transactions.

Referring again to FIG. 1B, the computer readable medium 180 may also include a receipt identifier generation engine 154. The receipt identifier generation engine 154 may assign an identifier to each receipt received on the portable device 100, the identifier may be alphanumeric, such as a 3 string number, or include additional identifying information, such as the merchant category code, a partial name of the merchant, a URL, or any other combination of numbers, letters, and/or other symbols. In one implementation, the identifier may be in the form of a barcode, a quick response code, and/or the like. Both the generated identifier and an original or copy of the electronic receipt, as provided by the merchant, may be communicated to and stored by the memory 162 of the portable device 100. The electronic receipt may include information such as transactions details (e.g., total cost, tax, SKU numbers, item description and individual item costs, and/or the like). The receipt may also include information such as a merchant name, merchant category code, merchant location, store number, time/date stamp, and/or the like. In some implementations, the receipt may also include coupons, offer, codes, and/or the like. Such coupons, offers, code, and/or the like may be dynamic in nature in some implementations. Some of the aforementioned information may only be desired for further processing of the transaction and/or for the merchant's reference, and the user of the device may prefer not to view all of the information associated with the electronic receipt. Accordingly, the computer readable medium 180 on the portable device 100 may also include a receipt formatting engine 156, which extracts and/or maintains only information preferred by the user and formats that information into a list of receipts. The list of receipts is displayed by the RM application 152 to the user. In one implementation, the RM application 152 may include the facilities of the receipt identifier generation engine 154 and the receipt formatting engine 156. In one implementation, the computer readable medium 180 may include a transaction application 160 which may be executed to transfer account details to the access device, receive an authorization response and, receive the electronic receipt for the transaction.

FIG. 1C shows a block diagram illustrating an exemplary access device in some embodiments of the ERM. The term access device may be utilized interchangeably with a terminal or a point of sale (PoS) device. The access device 196 may comprise a processor 186 operatively coupled to a computer readable medium 188 (e.g., one or more memory chips, and/or the like), input elements 184 such as buttons, key pad, mouse, and/or the like, an output device 190 (e.g., a display, a speaker, and/or the like) and one or more interfaces 194. In one embodiment, the access device 196 may include only a reader 182, processor 186, computer readable medium 188 and interface 194. A housing may house one or more of these components. The computer readable medium 188 may comprise instructions or code, executable by a processor. The computer readable medium may additionally store massage passing interface (MPI) software capable of communicating card information through the network to the directory server and the merchant. The one or more interfaces 194 may be a wired or wireless interfaces capable of communication with the reader. In another embodiment, interface 194 may be a network interface for direct communication with an acquirer, the directory server, the merchant, and/or the like an issuer.

Figure 2A:
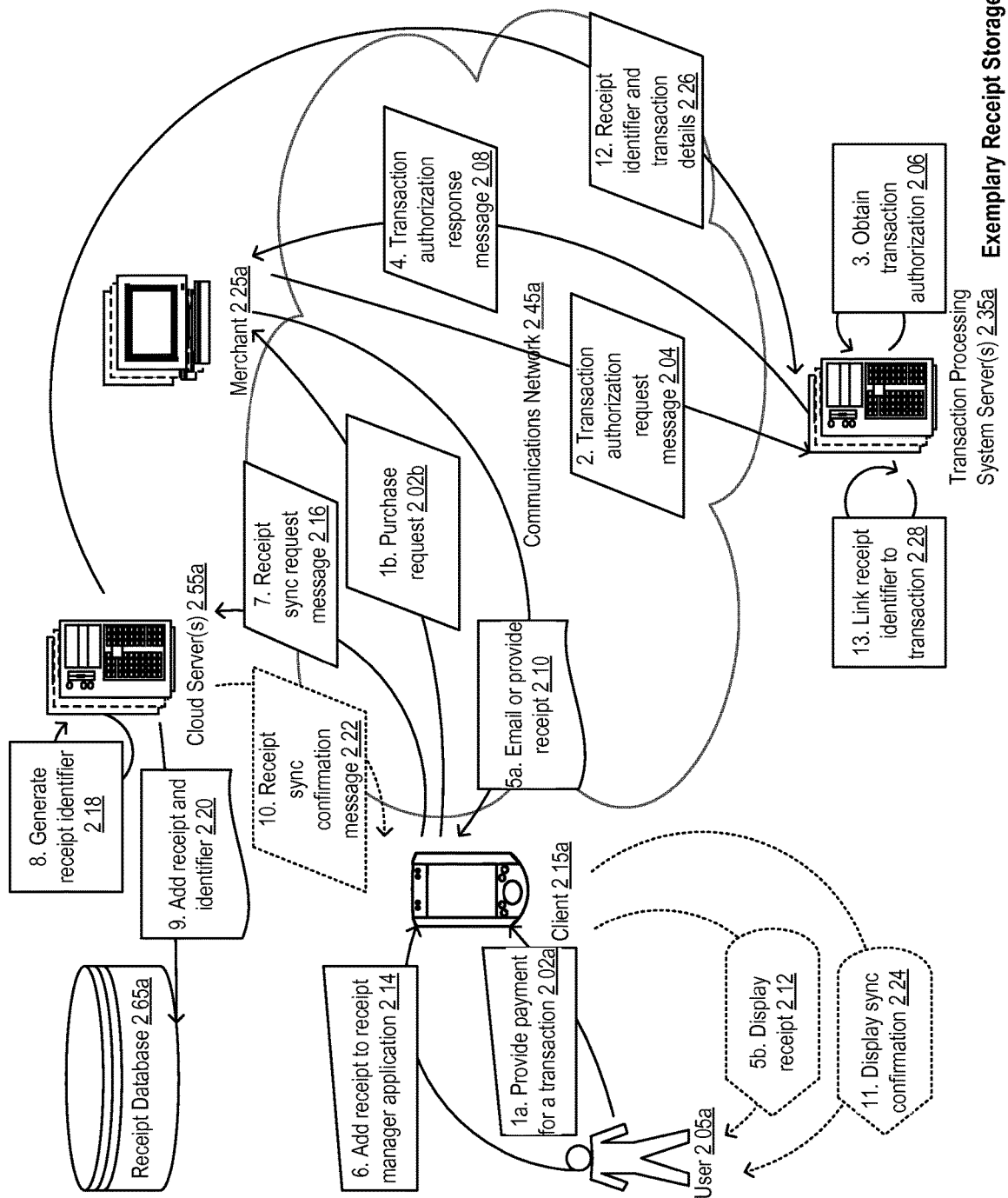
FIG. 2A shows a data flow diagram illustrating exemplary receipt storage in some embodiments of the ERM.

FIG. 2A shows a data flow diagram illustrating exemplary receipt storage in some embodiments of the ERM. Since aspects of the ERM facilitate storage and retrieval of electronic receipts, the data flow diagram illustrates messages that are exchanged between a user 205a, client 215a, a merchant 225a, a cloud server 255a and a TPS server 235a over a communication network 245a. The messages may facilitate storage of, electronic receipts in a manner that allows a user 205a to effectively search and retrieve a desired receipt using an RM application installed in the client 215a or access a desired receipt from an online account with the TPS server 235a (e.g., an issuer bank account).

At 202a, the user 205a may provide payment information to a merchant 225a (e.g., merchant access device or merchant server) for a transaction. When the transaction is conducted online using an electronic wallet account or payment cards, the user may input wallet authentication details (e.g., wallet account username and password) or payment card information (e.g., payment card number, name, expiration date, security code, billing address, and/or the like) to his or her client 215a, which in turn creates and sends a purchase request 202b to the merchant server 225a. When the transaction is conducted in person, the user may provide payment information directly to the merchant via an access device similar to one described in FIG. 1C. In one implementation, the purchase request 202b sent via the client 215a to the merchant 225a may be an HTTP(S) POST message including XML formatted data. An example listing of the purchase request 202b, substantially in the form of a HTTP(S) POST message including XML-formatted data, is provided below:

```
POST /purchaserequest.php HTTP/1.1
Host: www.merchant.com
Content-Type: Application/XML
Content-Length: 667
<?XML version = "1.0" encoding = "UTF-8"?>
<purchase_request>
    <purchase_ID>6789879879</purchase_ID>
    <timestamp>20XX-01-01 06:55:22</timestamp>
    <payment_details>
        <card_num>698797454654</card_num>
        <card_type>visa</card_type>
        <card_name>John Doe</card_name>
        <billing_zipcode>10112</billing_zipcode>
    </payment_details>
    <product_details>
        <product_id = 687987A</product_id>
        <product_name>mixer</product_name>
        <product_qty>4</product_qty>
        <price>15</price>
    </product_details>
<client_details>
    <client_ID>7897129382</client_ID>
    <client_type>smartphone</client_type>
    <client_mode>HTC hero</client_mode>
    <OS>Android 2.0</OS>
</client_details>
</purchase_request>
```

After receiving the purchase request 202b from the client 215a, the merchant 225a may parse the request and extract payment information necessary to create a transaction authorization request message. The transaction authorization request message 204 may be sent to the TPS server 235a. In one implementation, the authorization request message 204 from the merchant 225a to the TPS server 235a may be an HTTP(S) POST message including XML formatted data. An example listing of the authorization request message 204, substantially in the form of a HTTP(S) POST message including XML-formatted data, is provided below:

```
POST /authorizationrequest.php HTTP/1.1
Host: www.acquirer.com
Content-Type: Application/XML
Content-Length: 1406
<?XML version = "1.0" encoding = "UTF-8"?>
<authorization_request>
    <transaction_ID>6789879879</transaction_ID>
    <timestamp>20XX-01-01 06:55:22</timestamp>
    <payment_details>
        <card_num>698797454654</card_num>
        <card_type>visa</card_type>
```

```
            <expiration_date>20XX-11-12</expiration_date>
            <cardholder_name>John Doe</cardholder_name>
            <billing_zipcode>10112</billing_zipcode>
            <card_security_code>6566</card_security_code>
            <cashier_ID>NY97899</cashier_ID>
            <amount>60.00</amount?
            <location_ID>10112</location_ID>
            <industry_type>retail</industry_type>
        </payment_details>
        <product_details>
            <product_id =M687987A</product_id>
            <product_name>mixer</product_name>
            <product_qty>4</product_qty>
            <price>15</price>
        </product_details>
    <client_details>
        <client_ID>7897129382</client_ID>
        <client_type>smartphone</client_type>
        <client_mode>HTC hero</client_mode>
        <OS>Android 2.0</OS>
    </client_details>
    </authorization_request>
```

The TPS server 235a may obtain authorization for the transaction at 206. In one implementation, the authorization request message may be received by an acquiring bank (or processing bank). The acquiring bank may send the authorization request message to respective credit card associations (CCA) (e.g., Visa, MasterCard, American Express, Discover, and/or the like). The CCA may forward the authorization request message to the card issuer, which in turn may approve or decline the transaction. The response from the card issuer may then be sent back to the merchant via the CCA and acquiring bank as the transaction authorization response message 208. In one implementation, the authorization response message 208 from the TPS server 235a to the merchant 225a may include information such as client transaction ID, TPS transaction ID, authorization code, transaction status message, and/or the like. If the transaction is approved, the merchant 225a may provide a receipt 210 to the user 205a or the client 215a. In some implementations, the receipt may be an electronic receipt document or image file provided via email, a data package (e.g., XML) sent from the merchant (e.g., access device) to the user's client, a web page confirmation, and/or the like. At 212, the client 215a may optionally display the receipt to the user 205a upon receiving the receipt 210 from the merchant 225a. In one implementation, the RM application may obtain the data package and extract information in the data package to create and display the receipt corresponding to the transaction. In another implementation, a barcode (e.g., Quick Response code) including receipt data may be displayed at the merchant terminal. The user may capture the image of the barcode, which may be read by the RM application to generate and display the corresponding receipt.

At 214, the user may add a receipt to the RM application on his or her client 215a. The client 215a may generate a sync receipt request message 216 and send the message to the cloud server 255a. In one implementation, the receipt sync request 216 may be sent to the cloud server 255a as an HTTP(S) POST message including XML formatted data. An example listing of the receipt sync request message 216, substantially in the form of a HTTP(S) POST message including XML-formatted data, is provided below:

```
POST /syncrequest.php HTTP/1.1
```

```
Host: www.cloud.com
Content-Type: Application/XML
Content-Length: 667
<?XML version = "1.0" encoding = "UTF-8"?>
<sync_request>
    <user_ID>Jdoe@gmail.com</user_ID>
    <password>testtest2</password>
    <timestamp>20XX-03-01 08:08:22</timestamp>
    <receipt_details>
        <receipt1>
            <data_file>hdjwhdewf873894753rfowjefs</data_file>
            <file_name>emailreceipt_20XX0505R0776337135
            </filename>
            <format>pdf</format>
            <category>electronics</category>
        </receipt1>
        <receipt2>
            <data_file>qwdkjds798jloij6</data_file>
            <file_name>receipt_data</file_name>
            <format>txt</format>
            <category>groceries</category>
        </receipt2>
        <receipt3>
            <data_file>weodkwipodiwpoei85bkj6</data_file>
            <file_name>gapreceipt20XX0501ny</file_name>
            <format>jpg</format>
            <category>groceries</category>
        </receipt3>
<client_details>
    <client_ID>7897129382</client_ID>
    <client_type>smartphone</client_type>
    <client_mode>HTC hero</client_mode>
    <OS>Android 2.0</OS>
</client_details>
</sync_request>
```

After receiving the receipt sync request message 216 from the client 215a, the cloud server 255a may generate a receipt identifier at 218. In one implementation, the cloud server may parse the request message to obtain receipt data and use all or a portion of the receipt data to generate the receipt identifier. The cloud server 255a may further store the receipt received from the client in association with the receipt identifier in a receipt database 265a. For example, the cloud server 255a may issue PHP/SQL commands to store the receipt data to a database table (such as FIG. 9, receipt table 919c). An example add receipt and receipt identifier command 220, substantially in the form of, PHP/SQL commands, is provided below:

```
<?PHP
header('Content-Type: text/plain');
mysql_connect("254.92.185.103",$DBserver,$password); // access
database server
mysql_select("ERM_DB.SQL"); // select database to append
mysql_query("INSERT INTO ReceiptsTable (receipt_ID,
    receipt_category, user_ID, receipt_path)
VALUES ($receipt_ID, $receipt_category, $user_ID, $receipt_path)");
    // add data to table in database
mysql_close("ERM_DB.SQL"); // close connection to database
?>
```

In one implementation, the cloud server 255a may send a receipt sync confirmation message 222 to the client 215a upon storing the receipt in the receipt database 265a. The confirmation message may also be displayed on the client 215a at 224. In one implementation, the confirmation message 222 may include receipt identifier(s) for each receipt that was sent to the cloud server 255a for syncing. The cloud server 255a may also send the receipt identifier and transaction details 226 to the TPS server 235a. In one implementation, the message 226 may be sent to the TPS server 235a as an HTTP(S) POST message including XML formatted data. An example listing of the message 226, substantially in the form of a HTTP(S) POST message including XML-formatted data, is provided below:

```
POST /receiptdata.php HTTP/1.1
Host: www.transactionprocessor.com
Content-Type: Application/XML
Content-Length: 667
<?XML version = "1.0" encoding = "UTF-8"?>
<receipt_data>
    <user_info>
        <user_ID>Jdoe@gmail.com</user_ID>
        <payment_ID>517826312739</payment_ID>
        <user_address>200 Summit Hill, New York, NY 10112
        </user_address>
    </user_info>
    <timestamp>20XX-03-01 08:08:22</timestamp>
    <receipt_details>
        <receipt1>
            <data_file>hdjwhdewf873894753rfowjefs
            </data_file>//optional
            <receipt_ID>JD20XX176</receipt_ID>
            <client_transaction_ID>47668980
            </client_transaction_ID>
            <category>electronics</category>//optional
        </receipt1>
        <receipt2>
            <data_file>qwdkjds798jloij6</data_file>
            <receipt_ID>JD20XX166</receipt_ID>
            <client_transaction_ID>67898980
            </client_transaction_ID>
            <category>electronics</category>//optional
        </receipt2>
        <receipt3>
            <data_file>weodkwipodiwpoei85bkj6</data_file>
            <receipt_ID>JD20XX678</receipt_ID>
            <client_transaction_ID>47668456
            </client_transaction_ID>
            <category>groceries</category>//optional
        </receipt3>
    </receipt_details>
</receipt_data>
```

The transaction details 226 may be parsed by the TPS server 235a and compared with transaction records to identify a transaction corresponding to the receipt identifier. The TPS server 235a may link the receipt identifier to one or more identified transactions at 228, thereby facilitating efficient and fast access to receipts for transactions.

Figure 2B:
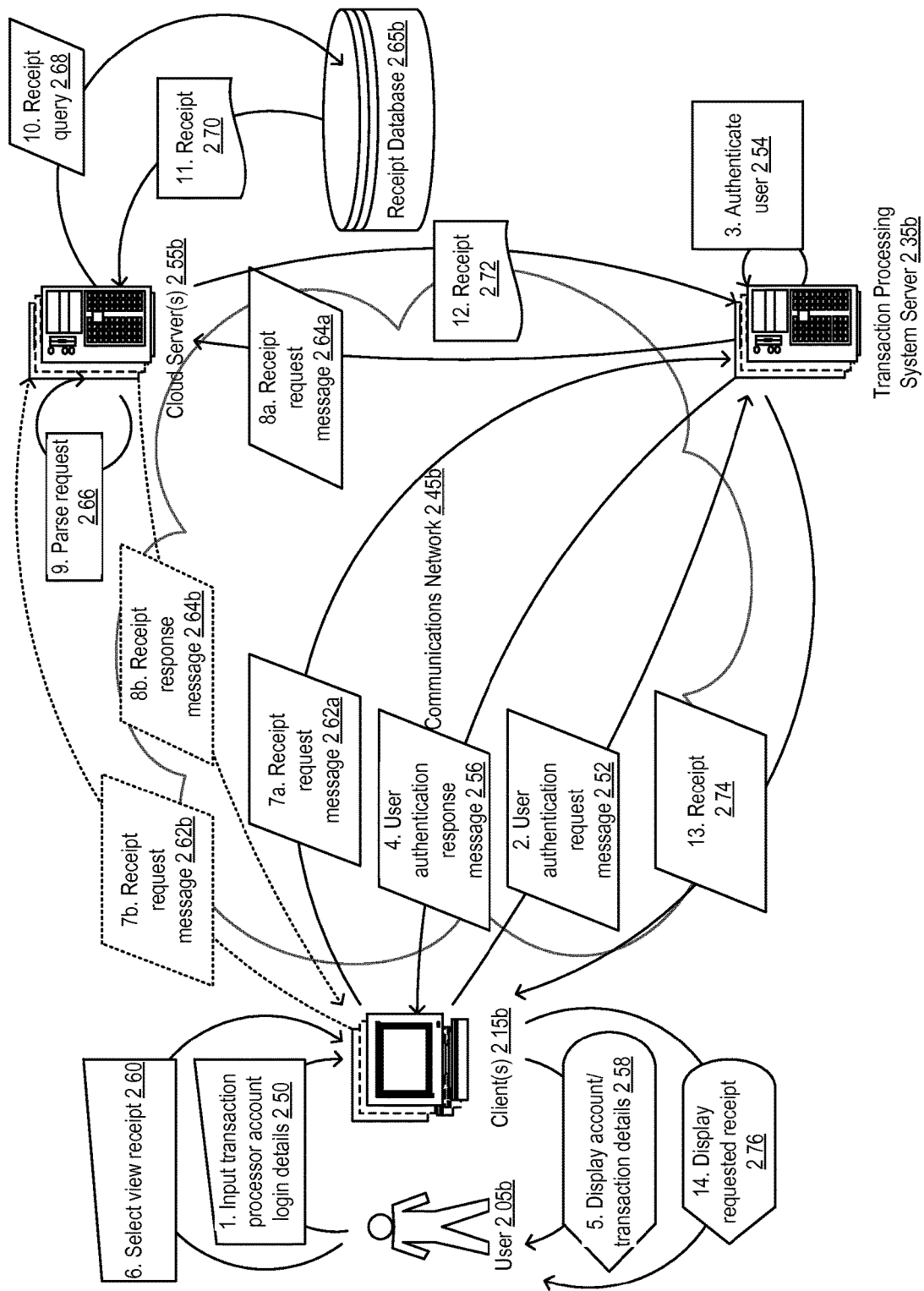
FIG. 2B shows a data flow diagram illustrating exemplary receipt access in some embodiments of the ERM.

FIG. 2B shows a data flow diagram illustrating exemplary receipt access in some embodiments of the ERM. As shown, the ERM provides users access to stored receipts pertaining to a desired transaction directly from their client devices. The user 205b may input into a client 215b, an online account (e.g., issuer account) login credentials in a web or mobile interface of the online account at 250. The client 215b may receive the login credentials and may package the data in a user authentication request message 252 that is sent over a communication network 245b to the TPS server 235b. In one implementation, the authentication request message 252 may be sent to the TPS server 235b as an HTTP(S) POST message including XML formatted data. An example listing of the authentication request message 252, substantially in the form of a HTTP(S) POST message including XML-formatted data, is provided below:

```
POST /authenticationrequest.php HTTP/1.1
Host: www.transactionprocessor.com
Content-Type: Application/XML
Content-Length: 667
<?XML version = "1.0" encoding = "UTF-8"?>
<authentication_request>
    <request_ID>JHJKKLJ68JK</request_ID>
    <timestamp>20XX-03-01 08:08:22</timestamp>
    <user_ID>Jdoe@gmail.com</user_ID>
    <password>testtest2</password>
    <client_details>
        <client_IP>192.168.23.122</client_IP>
        <client_type>smartphone</client_type>
        <client_model>HTC Hero</client_model>
        <OS>Android</OS>
        <app_installed_flag>true</app_installed_flag>
    </client_details>
</authentication_request>
```

After receiving the authentication request message 252, the TPS server 235b may parse the message and extract login details such as username, password, and/or the like. The TPS server 235b may compare the extracted login details to information in a database to authenticate the user at 254. When the user provided login credentials match with the ones in the database (e.g., 919a, FIG. 9), the TPS server 235b may generate and send a user authentication response message 256 accepting the request. In one implementation, the authentication response message 256 may include information such as authentication status (e.g., fail or success), login name, message (e.g., reasons for authentication failure, account name), and/or the like. Once the user is authenticated, the client may display the landing page for the online account (e.g., account summary page) at 258.

The user 205b may navigate through the online account site or application to a transaction summary page (e.g., FIGS. 8C and 8D). At 260, the user may select a link or an icon for receipt (e.g., 825f, FIG. 8D) next to a desired transaction to view the receipt corresponding to the transaction. The client 215b may receive the user's selection and may generate and send to the TPS server 235b a receipt request message 262a. In one implementation, the receipt request message 262a may be sent to the TPS server 235b as an HTTP(S) POST message including XML formatted data. An example listing of the receipt request message 262a, substantially in the form of a HTTP(S) POST message including XML-formatted data, is provided below:

```
POST /requestrequest.php HTTP/1.1
Host: www.transactionprocessor.com
Content-Type: Application/XML
Content-Length: 667
<?XML version = "1.0" encoding = "UTF-8"?>
<receipt_request>
    <request_ID>LOYBKLJ68JK</request_ID>
    <timestamp>20XX-03-01 08:08:22</timestamp>
    <user_ID>Jdoe@gmail.com</user_ID>
    <password>testtest2</password>
    <receipt_ID>20XX5679</receipt_ID>
    <client_details>
        <client_IP>192.168.23.122</client_IP>
        <client_type>smartphone</client_type>
        <client_model>HTC Hero</client_model>
        <OS>Android</OS>
        <app_installed_flag>true</app_installed_flag>
    </client_details>
</receipt_request>
```

The TPS server 235b, in turn, may forward the request to the cloud server 255b as a receipt request message 264a. The cloud server 255b may receive the receipt request message 264a and may parse the request at 266. Using parameters (e.g., receipt identifier) from the parsing, the cloud server 255b may create and execute a receipt query 268 on a receipt database 265b. In one implementation, for example, the cloud server 255b may issue PHP/SQL commands to query the receipt database table 265b (e.g., 919c, FIG. 9) for receipt data. An example receipt query 268, substantially in the form of PHP/SQL commands, is provided below:

```
<?PHP
header('Content-Type: text/plain');
mysql_connect("254.93.179.112",$DBserver,$password); // access database server
mysql_select_db("ERM_DB.SQL"); // select database table to search
//create query
$query = "SELECT receipt_path receipt_field1 receipt_field2 FROM ReceiptTable
    WHERE receipt_ID LIKE '%' $receipt_ID"; //default or custom receipt fields may be specified
$result = mysql_query($query); // perform the search query
mysql_close("ERM_DB.SQL"); // close database access
?>
```

The receipt query may return a receipt 270 that matches the parameters in the query. The cloud server 255b may then send the matching receipt 272 to the TPS server 235b, which in turn may send the received receipt as the receipt message 274 to the client 215b. After receiving the receipt message 274, the client 215b may display the receipt to the user 205b at 276. In one implementation, the receipt request 264a may be made using an application programming interface (API) call to the cloud server 255b, the receipt 272 being returned in response to the API call. For example, the TPS server 235b may call a getReceipt API method to obtain a receipt file and/or receipt data. An exemplary GET request method for making the call is provided below. The API key and token for making such calls may be provided to the TPS server 235b before making the call.
http://server1.cloud.com/receipt/api/getReceipt?callid= 100008&callno=1&apikey=aK2Lejj89j2A1_lOn4s2& token=u:c6a5941420cf67578986abe8e09a8299&receiptid= 20XX6789

In another implementation, a receipt request message 262b may be generated and sent to the cloud server 255b, instead of the receipt request message 262a. The receipt request message 262b may have a data structure similar to the receipt request message 262a. The cloud server 255b may parse the request at 266, generate and execute a query on the receipt database 265b at 268 and provide results of the query 270 to the client 215b in a receipt response message 262b. In one implementation, call backs via APIs, inline widgets, and/or the like, may be used to pull receipt information from the cloud server 255b and display the pulled information inline at the account interface.

FIG. 3 shows a logic flow diagram illustrating exemplary receipt management (RM) component in some embodiments of the ERM. At 301, the user may purchase an item at a merchant location and initiate a transaction at the merchant's PoS terminal, such as the merchant register coupled to an access device. When a user initiates a transaction, the merchant device calculates the costs and appends additional transaction information. The transaction information may include merchant name, location, and time, along with itemized product information, pricing, and/or the like. The transaction information may include more or less information, dependent on both the merchant and the transaction type (e.g., warranties offered, returns availability, and/or the like). The transaction information may be sent to an access device, such as a payment card reader or PoS terminal, which may have both contact and contactless capabilities. The merchant register may communicate with an access device through a hard wired or wireless connection. In some implementations, the merchant register may comprise an access device, such as a one-piece PoS terminal and/or a portable device equipped with a card reader. The merchant register may include a computing device or similar module which has a display, keyboard interface, network connectivity and write capabilities. The access device can include a reader/writer coupled to a contact or contactless interface, which is capable of communicating with the user's portable device. The particular components of the access device are described in detail, in one implementation, with reference to FIG. 1C.

At 302, the access device may transfer information from the merchant to the portable device as well as transfer account information from the portable device to the merchant, while conducting a contact or contactless transaction. At 303, an electronic receipt may be received on the portable device. The receipt may be transferred in an alphanumeric format, as an image and/or other file type (e.g., a text file, a PDF file, an Excel file, and/or the like) and may depend on the vendor, access device, portable device type, user preferences, and/or the like. For instance, a cellular portable device may be capable of receiving an image of the receipt for viewing, while other portable devices may only be capable of receiving alphanumeric data. In one implementation, the portable device may include facilities for optical character recognition (OCR), and as such, may OCR receipts upon receiving them.

During the transaction, a transaction application located in the computer readable medium of the portable device (e.g., FIG. 1B), may be executed to transfer account details to the access device, receive an authorization response and, receive the electronic receipt for the transaction. At 304, after the transaction application is executed, the RM application may be executed to handle the incoming electronic receipt. The RM application may be executed in response to the transaction processing application executing, e.g., execution of the RM application may be initiated by an instruction included in the transaction processing application.

At 305, the receipt identifier generation engine may be executed, such as simultaneously with the RM application, in response to the transaction application and/or the RM application. Once the receipt generation engine is executed, a unique identifier is generated for the electronic receipt. The identifier, as previously noted, may include an alphanumeric string which may be randomly generated by the receipt generation engine, and/or generated based on information in the receipt, information associated with an issuer, credit card association (CCA), and/or the like.

At 306, the identifier generated for the receipt may be stored in the memory of the portable device in order for the user to be able to quickly call on the receipt for later viewing. In some embodiments, a copy of the original receipt is also stored in a memory of the portable device. At 307, the receipt formatting engine may communicate with the RM application to determine which information is desired from the receipt, based on the user's preferences. The receipt formatting engine may retrieve the preferred information and format the information into a table associated with the RM application. The table may include the selectable fields chosen by the user. In some embodiments, the RM application may include default fields which are utilized to format the receipt information. In other embodiments, the user may be prompted to select preferred fields when the application is downloaded and installed on the portable device.

At 308, the aforementioned selectable fields may be displayed to the user in the receipt application in a personalized format, such as in the receipt listing illustrated in FIG. 8A. In one implementation, the formatted receipt used in the RM application may also be stored in the memory of the portable device so that processing the receipt and reformatting the receipt only occurs when the receipt is originally received. However, if the user changes his or her preference for one or more fields for the receipts list view, the portable device may perform an update and call each receipt to reformat the information into the receipts listing.

The selection of the user preferred fields may be limited, dependent on the display size and memory capabilities of the portable device. In other embodiments, the table may include fields defined by rows in a table and display columns of a specified number of receipts per page, dependent on the RM application set-up. In some embodiments, the user may be able to predefine the display set-up of the RM application.

In an additional embodiment, at 309, the user's portable device may automatically forward a copy of the original receipt to an issuer of the users account, the CCA associated with the user's account, or both. The original receipt may be in the format provided by the merchant, so that retrieval and use of the receipt to dispute transactions with the merchant and/or account holder may be effectively processed.

Figure 4:
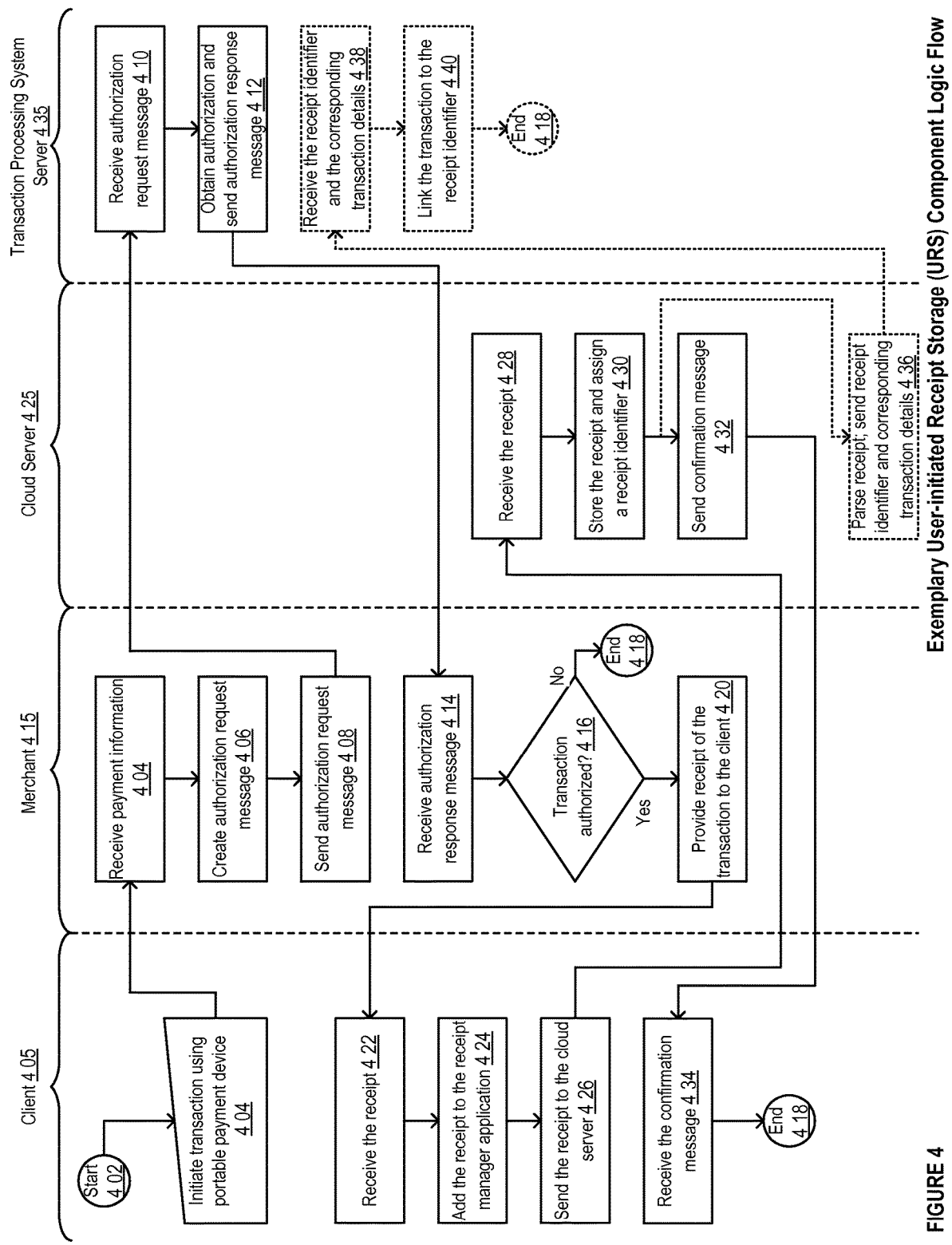
FIG. 4 shows a logic flow diagram illustrating an exemplary user-initiated receipt storage (URS) component in some embodiments of the ERM.

FIG. 4 shows a logic flow diagram illustrating an exemplary user-initiated receipt storage (URS) component in some embodiments of the ERM. The process may start at 402, when a user wishes to conduct a transaction with a merchant 415. At 404, the user may use his or her client 405 (e.g., portable device) to initiate a transaction with a merchant 415 at a PoS terminal or online. In one implementation, the transaction may be between two portable devices (e.g., peer to peer transaction), with one portable device acting as the consumer, and the other portable device acting as the merchant. Referring to FIG. 4, the merchant 415 may receive the payment information from the client 405 at 404. Using the user provided payment information, and details of the transaction (e.g., transaction amount, merchant information, product information, and/or the like), the merchant 415 may create an authorization request message at 406. At 408, the merchant 415 may send the authorization request message to a TPS server 435 for payment authorization. The TPS server 435 may receive the authorization request message at 410, and as previously discussed, the TPS server 435 may obtain authorization from the user's payment account issuer and send an authorization response message approving or declining the transaction to the merchant 415 at 412. The merchant 415 may receive the authorization response message at 414. At 416, if the transaction is not authorized, the process may end at 418. The merchant 415 may additionally inform the user that the transaction was not authorized and was consequently canceled.

However, if the transaction is authorized at 416, the merchant 415 may generate and provide a receipt for the transaction to the client 405 at 420. In one implementation, the merchant may transmit a copy of the receipt/receipt data to the TPS server 435 and/or the cloud server 425. In a further implementation, the merchant may need to be enrolled with the cloud server and/or TPS server, before forwarding receipts on behalf of, the user to the cloud server and/or TPS server. At 422, the client 405 may receive the receipt provided by the merchant 415. In some implementations, the receipt may be sent by the merchant 415 to the client 405 in an alphanumeric format, image format, other file formats (e.g., a text file, a PDF file, an Excel file, and/or the like) and/or other formats accepted by vendors, merchant access devices and/or the user's client 405. In one implementation, when a receipt is sent in alphanumeric format, the user may add the receipt data to the RM application installed in his or her client 405 at 424. The RM application in the client 405 may reformat the added receipt data according to user preference settings. In other implementations, a paper receipt or a confirmation page may be provided to the user's client 405. The user may utilize his or her client 405 to capture an image of the paper receipt and add the image to the RM application at 424. Receipts sent by the merchant 415 via communication channels such as email may be added to the RM application directly from the email application. In some embodiments, the receipts sent by the merchant 415 following a transaction may automatically be added to the RM application without explicit user instructions. The user may turn on such automatic addition of receipts to the RM application by modifying the RM application settings.

At 426, the client 405 may send the receipt to the cloud server 425 for syncing. In one implementation, syncing may automatically start after a receipt is added to the RM application. The automatic or manual sync preference may be specified by the user via the RM application settings. The cloud server 425 may receive the receipt for syncing at 428. Upon receiving the receipt, the cloud server 425 may generate a receipt identifier and store the receipt in association with the receipt identifier at 430. As previously described, the receipt identifier may be a unique identifier, and may include an alphanumeric string, such as may be randomly generated by the receipt generation engine. In some implementations, the receipt identifier may be generated based on a hash of the information in the receipt, user, issuer and/or CCA associated information. At 432, after storing the receipt along with a receipt identifier, the cloud server 425 may provide a confirmation message to the client 405. The client 405 may receive the confirmation message at 434. In one implementation, the confirmation message may be used by the RM application to manage receipts on the client 405. For example, the RM application may mark a receipt entry on the application with a sync or location status indicator (e.g., cloud or local) to indicate the location of the receipt, determine whether a re-sync is needed (e.g., when the sync is not successful), create a receipt delete queue (e.g., receipts in the cloud may be deleted first), and/or the like. The process may then conclude at 418.

In one embodiment of the URS component, the cloud server 425 may communicate directly with the TPS server 435 to link the receipts with corresponding transactions. Referring to FIG. 4, at 436, the cloud server 425 may parse the receipt received from the client 405, and send the receipt identifier, along with the receipt data, to the TPS server 435. The TPS server 435 may receive the receipt identifier and the receipt data at 438. The TPS server 435 may examine the transaction records associated with the user to identify a transaction having information that matches the receipt data. At 440, the TPS server 435 may link the receipt identifier to the identified transaction. As the linking associates the receipt identifier with the corresponding transaction, the TPS server 435 may provide users direct access to stored receipts from their user accounts with the TPS server 435. In some implementations, the receipt data may be incomplete or inadequate to identify a transaction. In such a situation, multiple receipts may be associated with a transaction, or a receipt may be associated with multiple transactions. The TPS server 435 may then provide the user an opportunity to definitively identify and associate receipts or receipt identifiers with a particular transaction. Such definitive userassisted link between a receipt and a transaction may then be stored in the TPS server 435, and reflected in the transaction summary in the user's account with the TPS server 435.

Figure 5:
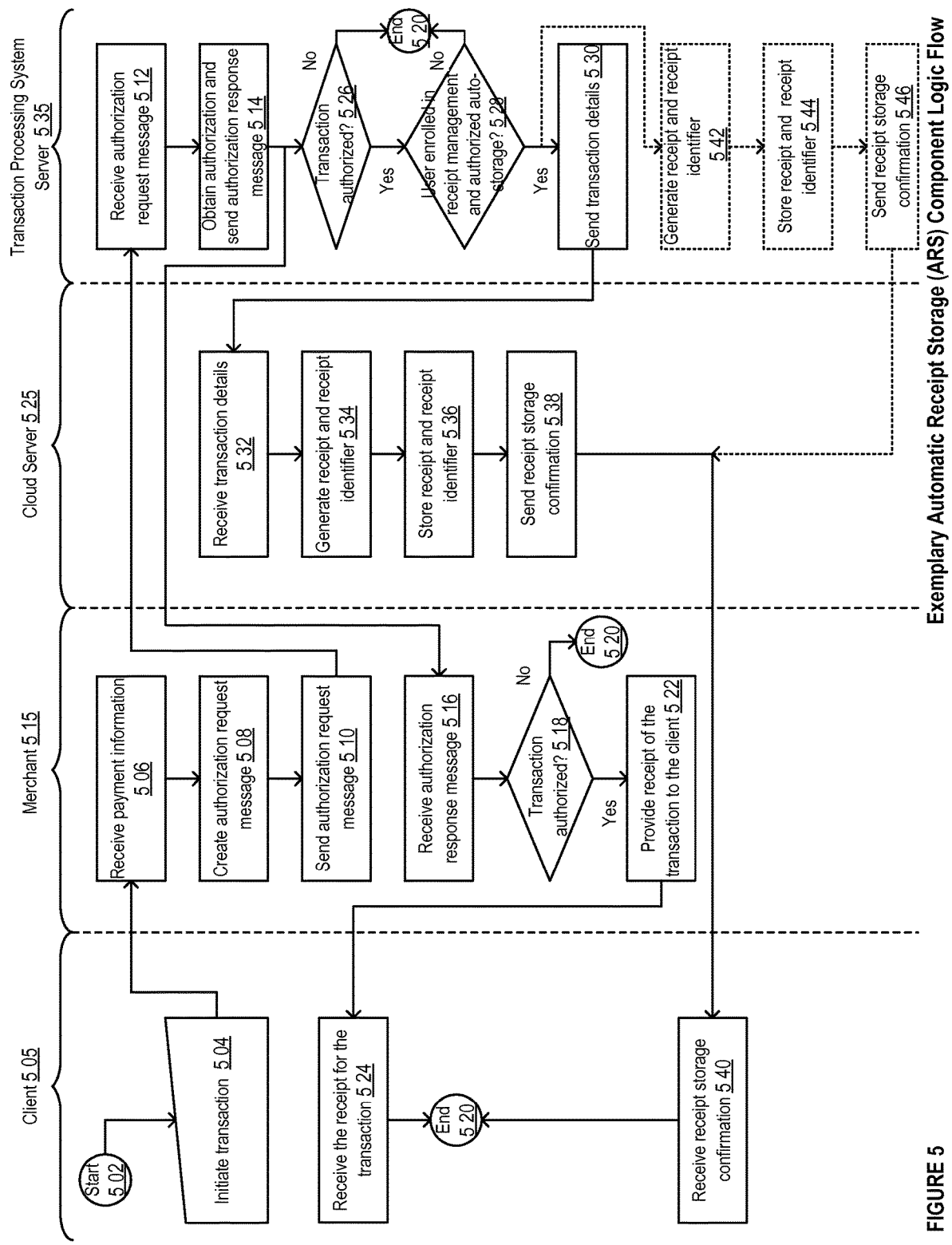
FIG. 5 shows a logic flow diagram illustrating an exemplary automatic receipt storage (ARS) component in some embodiments of the ERM.

FIG. 5 shows a logic flow diagram illustrating an exemplary automatic receipt storage (ARS) component in some embodiments of the ERM. Starting at 502, a user may initiate a transaction with a merchant 515 using a client device 505 (e.g., a portable device) at 504. The user's client 505 may interact with an access device such as a PoS terminal at the merchant 515. For example, the user may bring the client 505 in the vicinity of the access device (e.g., waving a phone in front of the access device). Such an interaction between a contactless element of the client 505 and the contactless portable device reader of the access device at the merchant 515 may result in an initiation of a transaction, such as a purchase. In one embodiment, the portable device may always be in payment mode, such that when the device is in the vicinity of a contactless PoS device, the payment application may automatically process the transaction. In another embodiment, a transaction may be manually initiated by a user when the client is brought to close proximity to an access device, and there may be no need to enter a password. Accordingly, the user may manually activate a payment application on the portable device, and if there is more than one instance of the payment application, the user may select one of the payment applications to use for the transaction. In yet another embodiment, a transaction may be manually initiated by a user when the user's portable device is brought to proximity to an access device, and a password may be required. The user may enter the password for the application previously set by the user before manually activating the payment application. In one implementation, transactions may be initiated via voice command, gestures, biometric techniques such as thumb print recognition, retina scan, and/or the like.

At 506, the merchant 515 may receive the payment information from the user via the access device. At 508, the merchant 515 may use the payment information and details of the transaction to create an authorization request message. At 510, the merchant may forward the authorization request message to the TPS server 535. The TPS server 535 may receive the authorization request message at 512. At 514, the TPS server 535 may obtain authorization and send an authorization response message to the merchant. In one implementation, authorization for the transaction may be obtained by sending an authorization request message to an acquiring bank, which in turn may forward the message to the CCA or payment processing network. The CCA may then forward the authorization request message to an issuing bank of an account associated with the payment information provided by the user. The issuing bank may receive the authorization request message and send an authorization response message back to the CCA to indicate whether or not the transaction is authorized. The CCA may then forward the authorization response message back to the acquiring bank, which in turn may send the response message back to the merchant.

At 516, the merchant 515 may receive the authorization response message. If the authorization response message at 518 indicates that the transaction is not authorized, the process may end at 520. In one implementation, the merchant 515 may forward the transaction decline message to the user and/or the user's client 505. If the transaction is authorized, the merchant 515 may provide a receipt for the transaction to the user or the user's client 505 at 522. In one implementation, the authorization response message may also be sent directly from the issuing bank to the user's client 505. The client 505 may receive the receipt for the transaction at 524, concluding the process at 520.

In one embodiment, after sending the authorization response message to the merchant 515 at 514, the TPS server 535 may determine if the transaction is authorized at 526. If the transaction is not authorized, the TPS server 535 may end the process at 520. However, if the transaction is authorized at 526, the TPS server 535 may further determine if the user is enrolled in receipt management and if the user has authorized automatic storage of receipts at 528. In one implementation, user enrollment data may be provided by the cloud server 525 to the TPS server 535 when a user account at the cloud server 525 is provisioned. If the determination at 528 is negative, the process may conclude at 520. On the other hand, if the determination at 528 is positive, the TPS server 535 may send the transaction details to the cloud server 525 at 530. In one implementation, the transaction details may be obtained from the authorization request/response messages. In a further implementation, the authorization request message may be a modified authorization request message including standard fields of information such as transaction amount, card verification value, service code, expiration date, merchant category code, an account number, merchant transaction ID, and/or the like, as well as additional information relating to product identifiers (e.g., SKU data), product cost, tax, discount, and any other information desired to generate a receipt for the transaction. Similarly, the authorization response message may include, among other fields of information, a TPS transaction ID. In some implementations, fields available as part of a normal authorization request/response message may be utilized to include the receipt data. For example, open characters available in the field or flags available in the request/response message may be utilized, or existing fields may be repurposed.

At 532, the cloud server 535 may receive the transaction details. At 534, the cloud server 525 may generate a receipt for the transaction using the transaction details, and an identifier for the receipt. In one implementation, each receipt may include a transaction ID (e.g., merchant transaction ID, TPS transaction ID, and/or the like). The same transaction ID may also be provided to the merchant 515 (e.g., in the authorization response message) by the TPS server 535. The transaction ID may be used to resolve any returns by the user, such as using the cloud server generated receipts. At 536, the cloud server 525 may store the receipt and the receipt identifier in a receipt database. At 538, the cloud server 525 may send a confirmation of receipt storage to the user's client 505. The confirmation message may be received by the user's client 505 at 540, concluding the receipt storage process at 520.

Referring to FIG. 5, in one embodiment, the TPS server 535 may assume the responsibility for receipt storage and management from the cloud server 525. At 542, the TPS server 535 may generate a receipt using the transaction details and an identifier for the receipt. At 544, the TPS server 535 may store the receipt and the associated receipt identifier in one or more databases and/or tables. At 546, the TPS server 535 may send a receipt storage confirmation message, including a receipt identifier, to the user's client 505.

Figure 6A:
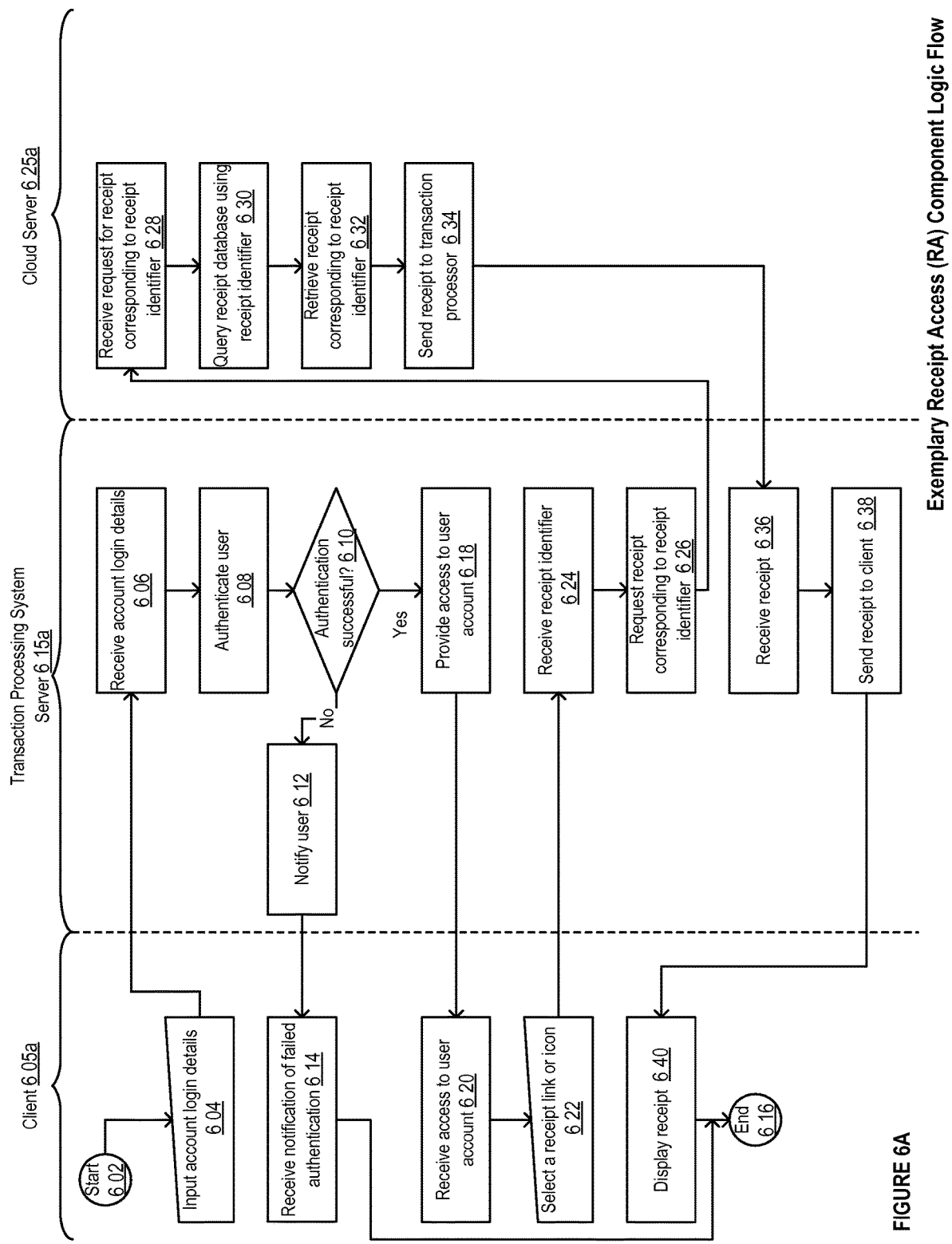
FIG. 6A shows a logic flow diagram illustrating an exemplary receipt access (RA) component in some embodiments of the ERM.

FIG. 6A shows a logic flow diagram illustrating an exemplary receipt access (RA) component in some embodiments of the ERM. In one embodiment, at 602, the user may start the process of receipt access by inputting to his or her client 605*a*, at 604, his or her online account login credentials. The online account may be associated with the TPS server 615*a* (e.g., an issuing bank or CCA) and may provide access to transactions conducted using payment devices (e.g., credit, debit or prepaid cards, bank accounts, open and closed loop gift cards, smart cards, and/or the like) issued by or associated with the TPS server 615*a*. The TPS server 615*a* may receive the account login credentials at 606. The TPS server 615*a* may compare the user provided login details with ones stored in the user accounts database (e.g., 919*a*, FIG. 9) to authenticate the user at 608. Other methods of authentication may be utilized by the TPS server 615*a*. If the authentication is determined to be unsuccessful at 610, the TPS server 615*a* may notify the user via the user's client 605*a* at 612. After receiving notification of failed authentication at 614, the process may end at 616. If the authentication is determined to be successful at 610, the TPS server 615*a* may provide the user access to the online account at 618. At 620, the user may receive access to the online account. The online account's landing page may be displayed on the display interface of the client 605*a*. The user may navigate through the online account web site or application to view a desired transaction listed in an account summary or statement. In some implementations, each transaction entry in the online account summary or statement may include a link or an icon for a receipt for the transaction. At 622, the user may select a receipt link or icon next to a transaction to view the receipt associated with the transaction. At 624, the TPS server 615*a* may receive an identifier of a receipt corresponding to the selected receipt link or icon from the user's client 605*a*. At 626, the TPS server 615*a* may request the receipt corresponding to the receipt identifier from the cloud server 625*a*. The cloud server 625*a* may receive the request at 628, and may in turn query a receipt database (e.g., 919*c*, FIG. 9) using the receipt identifier as a query parameter at 630. The query may return a receipt having a receipt identifier matching the query parameter at 632. The receipt may be sent to the TPS server 615*a* at 634. After receiving the receipt at 636, the TPS server 615*a* may send the receipt to the user's client 605*a* at 638. The client 605*a* may receive the receipt and display it on a display interface at 640, concluding the receipt access process at 616.

In an alternate embodiment, the selected receipt link or icon and associated receipt identifier may be sent to the cloud server 625*a*, instead of the TPS server 615*a*. The cloud server 625*a* may look up the receipt corresponding to the receipt identifier and provide the receipt to the user's client 605*a* for display as, for example, an iframe within the online account webpage or application.

Figure 6B:
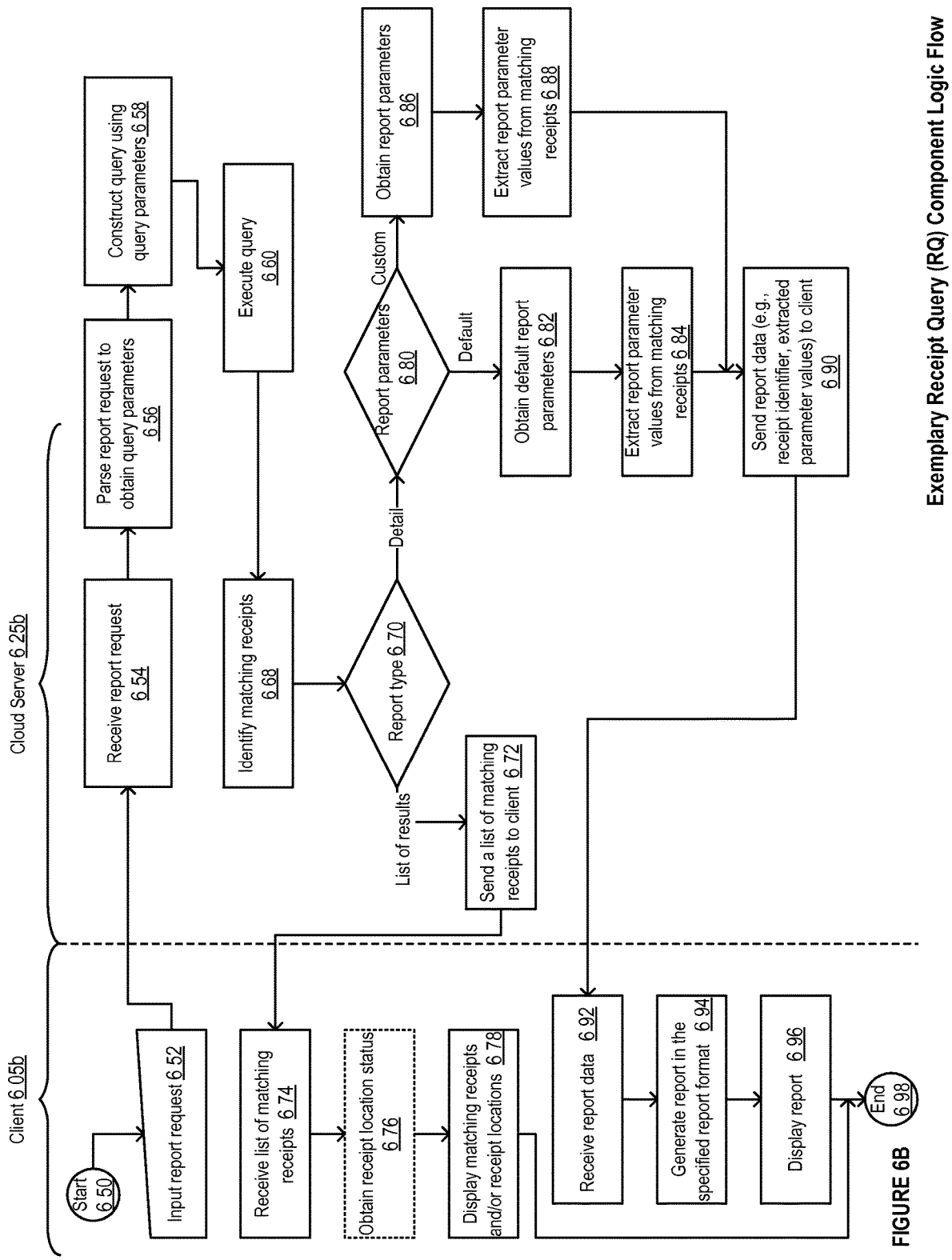
FIG. 6B shows a logic flow diagram illustrating an exemplary receipt query (RQ) component in some embodiments of the ERM.

FIG. 6B shows a logic flow diagram illustrating an exemplary receipt query (RQ) component in some embodiments of the ERM. In one embodiment, the RQ component may include a client 605*b* (e.g., portable device) and a cloud server 625*b*. Starting at 650, a user may input a report request via the client 605*a* at 652. The request may specify one or more receipt query parameters such as transaction date, merchant name or category code, purchase category, payment card account, receipt identifier, transaction ID, other custom category (e.g., merchants within a zip code, purchases exceeding a threshold amount, tax deductible purchase, and/or the like), and/or the like (e.g., FIGS. 7C and 7F). In a further implementation, the request may also specify a report type (e.g., list of results, custom or default). At 654, the cloud server 625*b* may receive the request. At 656, the cloud server 625*b* may parse the request to extract the one or more query parameters. At 658, the cloud server 625*b* may take the query parameters and construct a query for execution. At 660, the cloud server 625*b* may execute the query on one or more databases and/or tables (e.g., 919*c*, FIG. 9). After executing the query, at 668, the cloud server 625*b* may obtain query results that include receipts having receipt parameters that match the query parameters. In one embodiment, at 670, the cloud server 625*b* may determine the type of report requested and send results to the client 605*b* accordingly. For example, if the user requested a list of results, the cloud server 625*b* may send a list of matching receipt identifiers to the client 605*b* at 672. The client 605*b* may receive the list at 674. In some implementations, the client 605*b* may obtain the receipt location status (e.g., local, cloud) at 676 by performing a search of the receipts stored in the client 605*b*. At 678, the client 605*b* may display the results, along with the receipt location status, concluding the process at 698.

In one implementation, the user may request a detailed report at 670. If the user has provided custom report parameters at 680, the cloud server 625*b* may obtain the custom report parameters at 686. The custom report parameters may be included in the receipt request message and/or may be stored in a report database (e.g., 919*g*, FIG. 9). Using the custom report parameters, at 688, the cloud server 625*b* may extract custom report parameter values from the receipts obtained as query results. At 690, the cloud server 625*b* may send report data including custom report parameter values along with receipt identifiers to the user's client 605*b*. At 692, the client 605*b* may receive the report data. At 694, the user's client 605*b* may generate a report in the format specified by the user's preference settings. In one implementation, the formatting may be facilitated by the receipt formatting engine described with reference to FIG. 1B. At 696, the user's client 605*b* may display the formatted report to the user. In one implementation, the formatted report may be displayed within the RM application interface. In another implementation, the user may be provided an option to open the formatted report in other applications such as iBooks, Pages, and/or the like depending on the report format. The process may then conclude at 696.

In one implementation, if the user has not provided custom report parameters, the cloud server 625*b* may select default report parameters at 680. In one implementation, the selection of default report parameters may be based on target and/or requesting client capabilities. At 682, the cloud server 625*b* may obtain the default report parameters. As in the case when custom parameters are available, at 684, the cloud server 625*b* may extract default report parameter values from the receipts in the query result. Similarly, at 690, the cloud server 625*b* may send report data including the matching receipt identifiers and extracted default parameter values to the user's client 605*b*. The user's client 605*b* may then process the receipt data as described with respect to 692, 694 and 696.

Figure 7A:
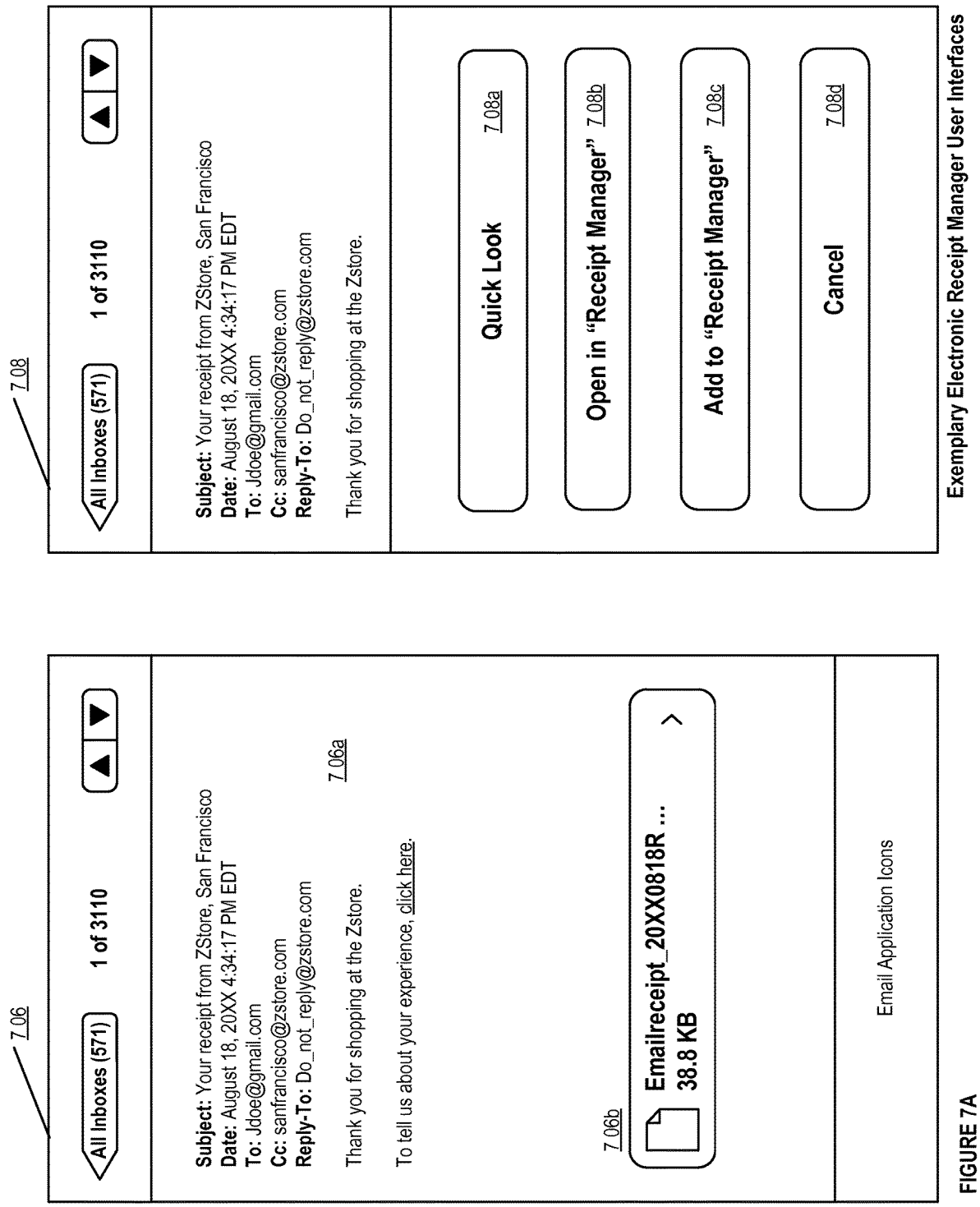

FIGS. 7A-F show schematic diagrams illustrating exemplary RM application user interfaces in some embodiments of the ERM. As shown, various aspects of the RM application features and functionalities in various implementations are illustrated in these figures. Referring to FIG. 7A, the user interface (UI) 706 may be that of an email application (e.g., "Mail" in iOS, "Gmail" in Android, and/or the like) showing the contents of an email. In one implementation, as indicated by the email data 706*a*, the email may be sent by or on behalf of a merchant (e.g., Zstore) to the email owner (e.g., J. Doe) after conducting a transaction with the merchant. As shown, the email may further comprise a receipt attachment 706*b*. When the receipt attachment 706*b* is selected, a menu similar to that shown in the UI 708 may be launched. The menu may include several buttons such as a quick look button 708a that allows the user to view the attachment 706b, an open in receipt manager button 708b that allows the user the open the attachment in the RM application, an add to receipt manager button 708c that allows the user to add the attachment to the RM application and a cancel button 708d that takes the user back to the UI 706. Other options may also be available, such as may depend on the format of the attachment.

Figure 7B:
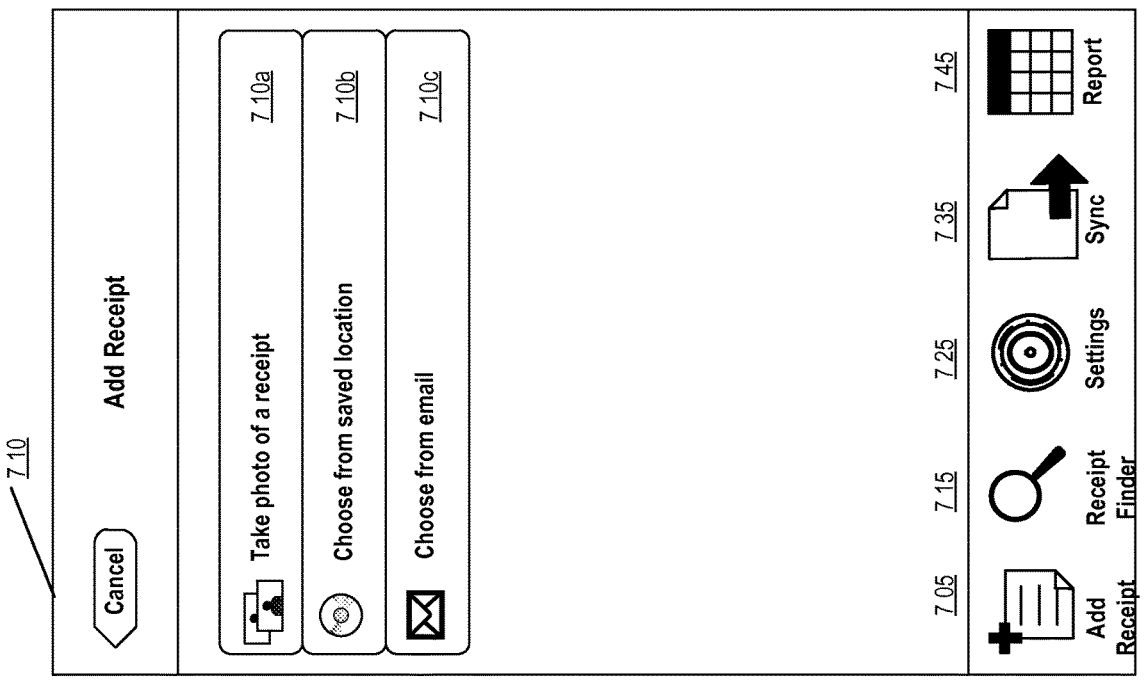

Referring to FIG. 7B, the RM application UI is illustrated. As shown, the UI may include several tab bar icons 705, 715, 725, 735 and 745 for various purposes. The UI 710, as shown, illustrates the display panel and options available when the add receipt tab bar icon 705 is selected by the user. The user may add a receipt to the RM application by selecting any of the options provided. For example, the user may select the option 710a to take a photo of a receipt using his or her portable device and add the photo to the RM application. The user may also select option 710b to choose a file from a saved location and add the chosen file to the RM application. For example, receipts in text, PDF or other formats may be saved in the portable device file system or applications such as iBooks. The user may use the option 710b to navigate to the location or application and select the desired receipt to import it to the RM application. In addition to the features described with respect to FIG. 7A, the user may also select choose from email option 710c to go to the application and select the desired attachment.

Figure 7C:
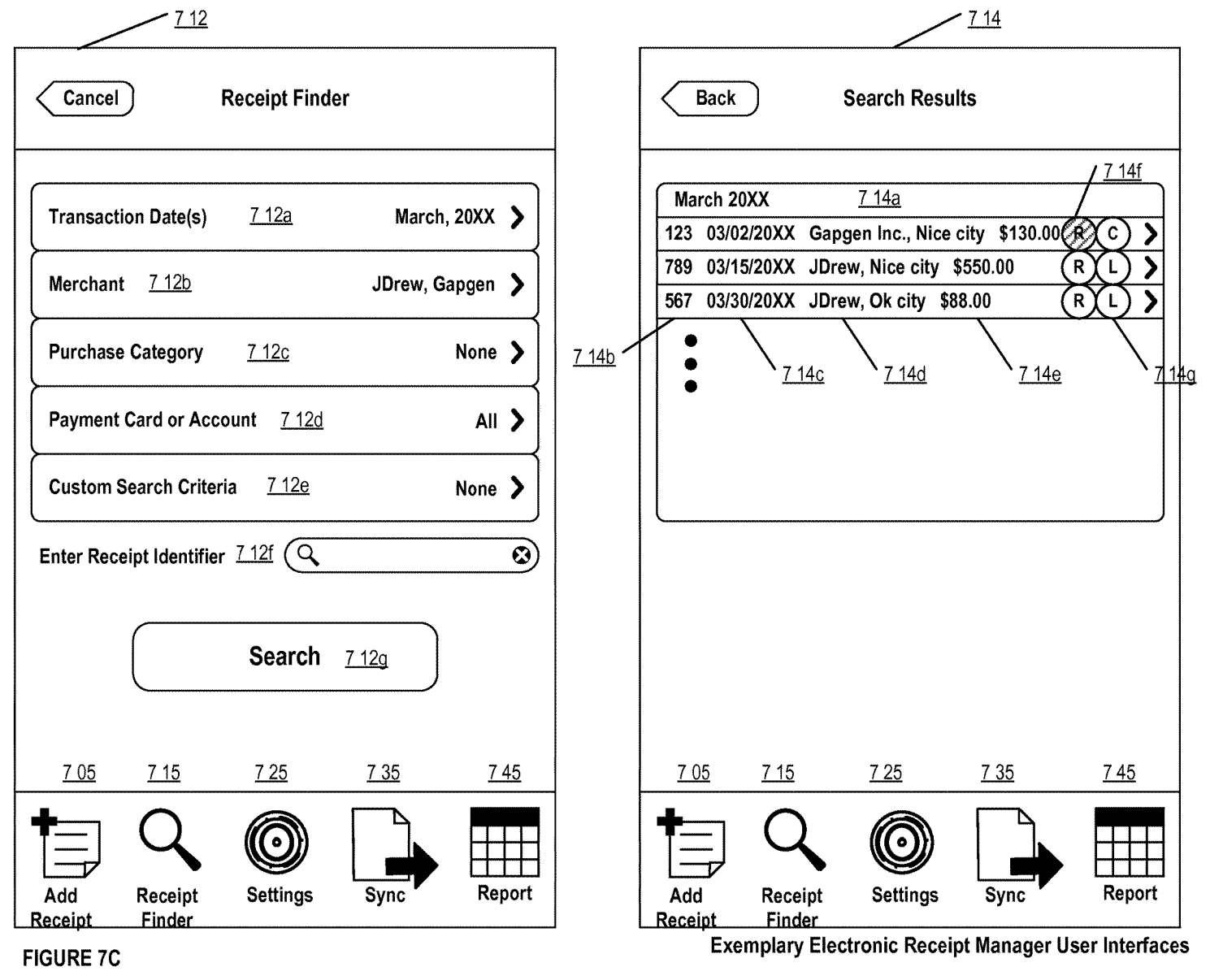

Referring to FIG. 7C, example UI 712 and 714 associated with the receipt finder tab icon 715 are illustrated. As shown in UI 712, the receipt finder tab provides several selection criteria that the user may utilize to find a desired receipt. For example, the user may specify a transaction date or a range using option 712a, one or more merchant names using option 712b, purchase category 712c (e.g., grocery, tax, healthcare, miscellaneous, and/or the like), payment card or account 712d, custom search criteria 712e (e.g., merchants within a zip code, purchases exceeding a threshold amount, and/or the like), and/or the like. In one implementation, the user may also enter a receipt identifier, a list of receipt identifiers (e.g., separated by space, comma or semicolon), a range of receipt identifiers at 712f as a search criteria. The user may then select the search button 712g to find receipts and/or receipt identifiers matching the provided search criteria. In some implementations, receipts may include coupons, codes, offers, and/or the like. The value of these coupons, codes, offers, and/or the like may be dynamic and may vary depending on the purchase amount, date and/or time of redemption, purchase item, purchase location, and/or the like. In one implementation, the RM application may extract details relating to such information and mark and/or categorize receipts including such information under a separate category (e.g., offers). In a further implementation, when the offer is no longer valid, the receipts may be d-categorized, such that the offers category includes receipts with valid offers. The categorization of receipts with offers may assist the user in looking up any offers relating to, for example a merchant, prior to making a purchase with the merchant.

The UI 714 illustrates an example display panel showing the search results. In one implementation, the search results may be provided as a listing arranged by, for example, transaction date 714a corresponding to the search parameters 712a. The listing may include a receipt identifier 714b, date of transaction 714c, merchant information 714d, transaction amount 714e, return eligibility status indicator 714f, receipt location indicator 714g, and/or the like. In one implementation, the return eligibility status indicator 714f may indicate whether the items purchased are eligible for return. For example, for the receipt with identifier 123, the return eligibility status indicator 714f, as shown, may indicate that a return is no longer possible (e.g., purchase occurred more than 90 days before), while the receipt with return eligibility status indicators 714f for receipts with identifiers 789 and 567 may indicate that the purchases are eligible for return. In one implementation, the return eligibility determination may be based on the examination of the merchant's rules and conditions for returns. In one implementation, the receipt location indicator 714c may indicate whether a copy of the receipt is available locally (e.g., "L" indicator) or in the cloud (e.g., "C" indicator).

In one implementation, in addition to the search results displayed in UI 714, the RM application may also display receipts that are related to the receipts in the search results. For example, a user may return one or more items associated with a receipt for refund. The RM application may associate the original purchase receipt with the receipt for refund, such that the user has a complete overview of the purchase and refund. The association between receipts may also assist the RM application in providing an actual spend amount, taking into account the refund amount. In one implementation, the relatedness may be established based on receipt data, and/or user input.

Figure 7D:
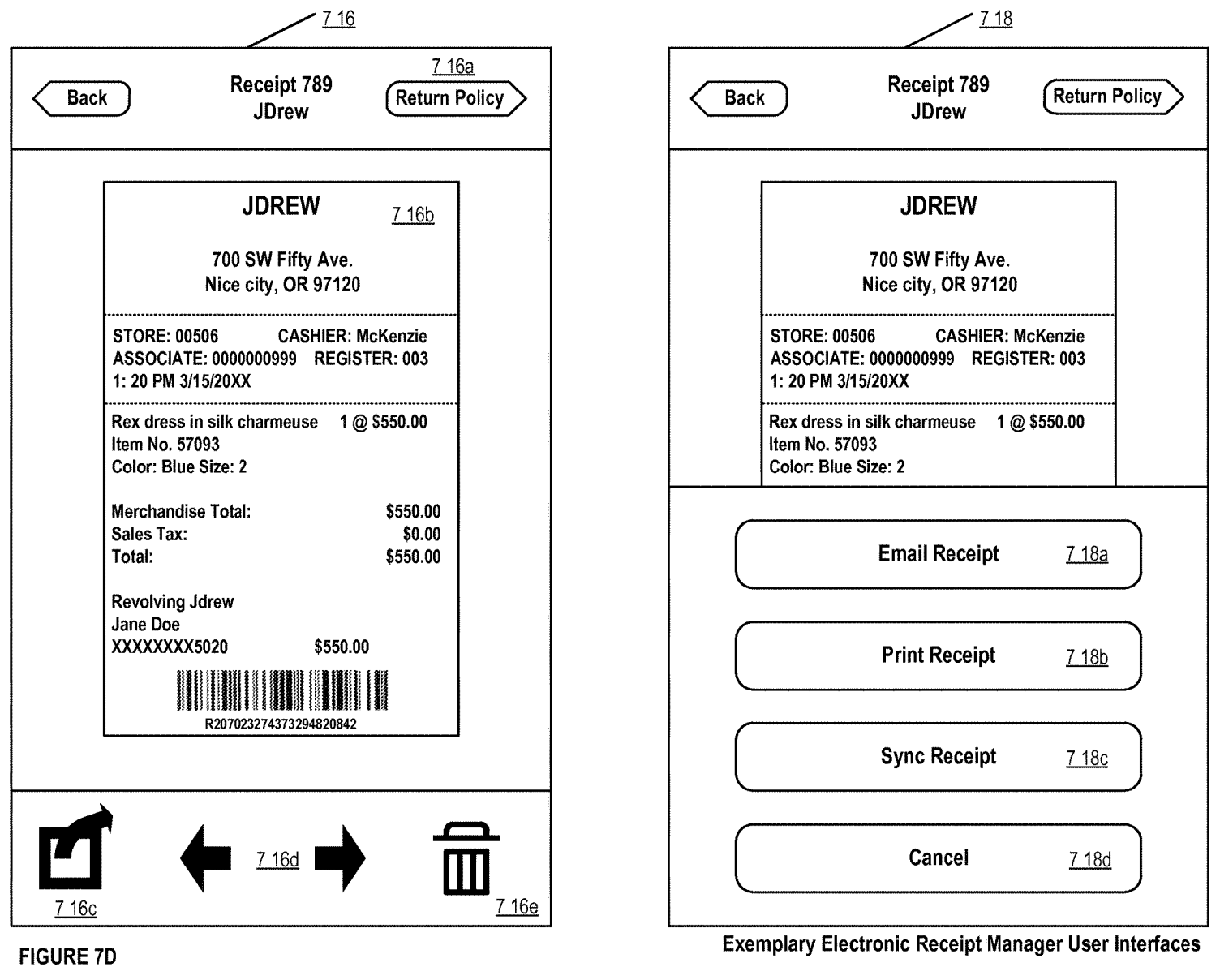

When one of the search results (e.g., receipt 789) is selected from the UI 714, the UI 716 of FIG. 7D may be displayed. The UI 716 may show the copy of the original (or cloud or TPS generated) receipt 716b for the transaction. The UI may also include an option to view the return policy for the merchant via the navigation bar icon 716a. In one implementation, the UI may include tab bar icons 716c, 716d and 716e for processing the receipt. For example, when the tab bar icon 716c is selected, the UI 718 may be displayed. As shown, UI 718 may include a menu including several options may be displayed. For example, the menu may include an option 718a to email the receipt being viewed, an option 718b to print the receipt, option 718c to sync the receipt, an option 718d to cancel and return to UI 716. In one implementation, the sync receipt option 718c may be displayed only when the receipt location indicator 714c (see UI 714, FIG. 7C) indicates that the receipt is stored locally. If the receipt is stored in the cloud, the option 718c may be modified to an option to download receipt, such that the receipt is accessible to the user even when the portable device is offline. Referring to UI 716, the user may use the left and right arrow tab bar icons 716d to view other receipts in the listing of search results (see UI 714, FIG. 7C), and the tab bar icon 716e to delete the receipt currently displayed in the display panel. In one implementation, icons for viewing the back of the receipt, rotating the receipt, zooming in or out and/or the like may be available in the RM application.

Figure 7E:
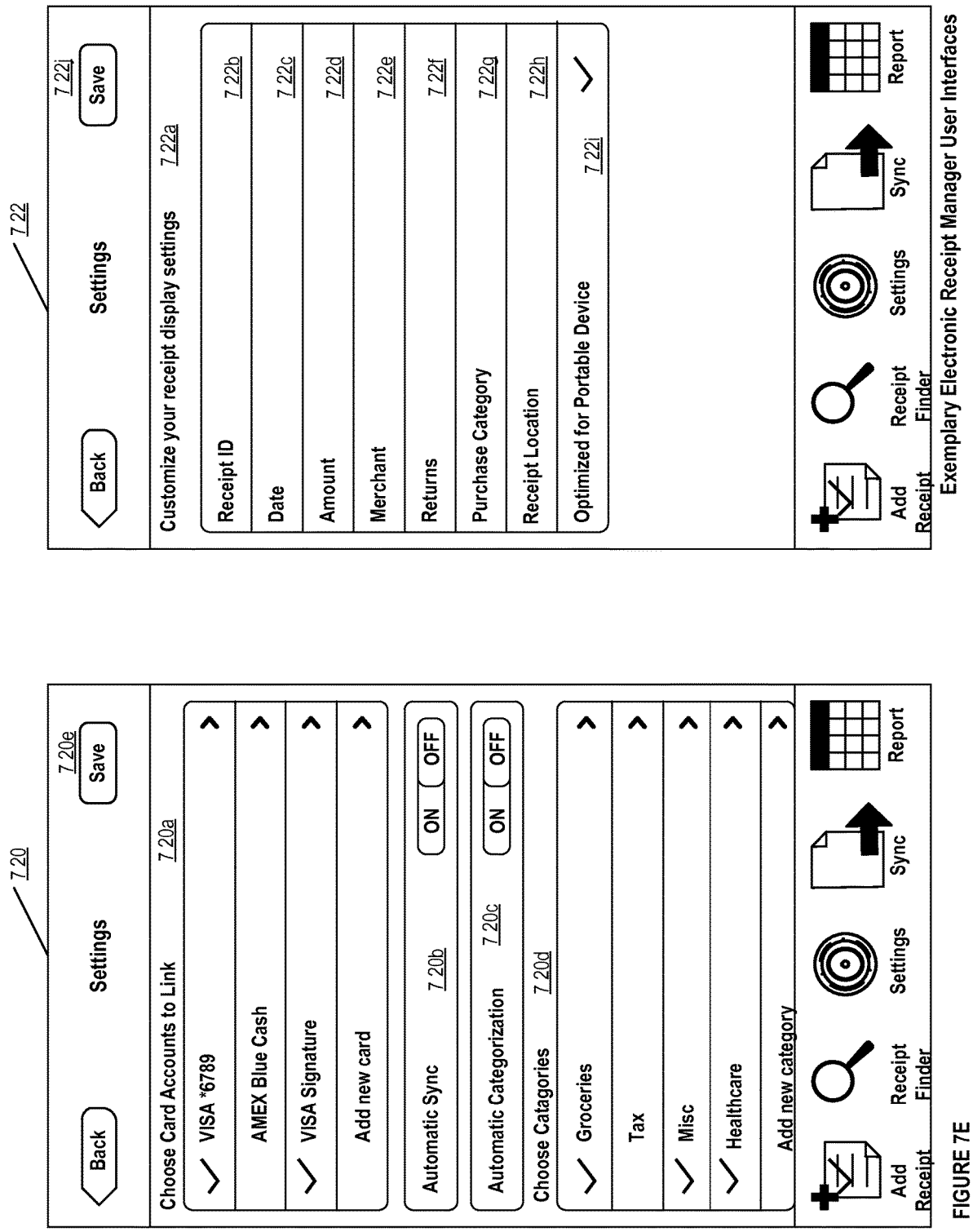

Referring to FIG. 7E, UI 720 and 722 associated with the settings tab icon 725 illustrate various options for setting up the preferences for receipt management in the RM application. Referring to UI 720, in one implementation, the user may use option 720a to select payment card accounts or issuers with which the user wishes to link receipts. For example, when the payment cards "VISA *6789" and "Visa Signature" are selected as shown, the RM application establishes a link between the issuers of the selected payment cards and receipts associated with the selected payment cards. In one implementation, establishing the link may include contacting the issuer on behalf of the user, providing user authorized information to the user, providing API keys and tokens, and/or the like. In one implementation, the user may be provided an option 720*b* for automatic sync, which when turned on, may cause the RM application to automatically sync receipts received by the portable device to the cloud. In another implementation, an option 720*c* may be provided, which when turned on, may cause the RM application to automatically categorize any receipts added to the RM application in one or more user-defined or default categories (e.g., healthcare, grocery, tax, school, and/or the like). In a further implementation, the user may select one or more categories listed under option 720*d* in which the receipts may be categorized. In one implementation, the RM application may prompt the user to enter a category for a receipt whenever a receipt for a transaction is received by the cloud server. In one implementation, such prompting may be in the form of an alert to the user. The alert may indicate an occurrence of a transaction. The alert may immediately inform the user of the transaction, and if the transaction is unauthorized, the user may take steps to address the fraud. In one implementation, a copy of the receipt may be provided with the alert. The user may save his or her setting preferences by selecting the save icon 720*e* in the navigation bar.

Referring to UI 722, the RM application may also include an option 722*a* for customizing receipt display. For example, the user may select one or more fields 722*b-i* for display in any receipt listing (such as the listing shown in UI 714, FIG. 7C, FIG. 8A). In one implementation, the user may have the option to select a receipt ID field 722*b*, date 722*c*, amount 722*d*, merchant 722*e*, returns 722*f*, purchase category 722*g*, receipt location 722*h*, optimized for portable device 722*i*, and/or the like. In a further implementation, the optimized for portable device 722*i* option may include a list of pre-configured fields suitable for display in the portable device (e.g., an iPhone with a certain display area, an iPad with a certain display area, display orientation, and/or the like). These customizations may be saved by selecting the save icon 722*j* on the navigation bar. In one implementation, selection of the sync tab bar icon 735 may cause the RM application to identify all receipts stored locally that have not been synced and sync them with the cloud server. In a further implementation, a listing of local receipts may be displayed for the user to review, select or deselect, and confirm sync.

Figure 7F:
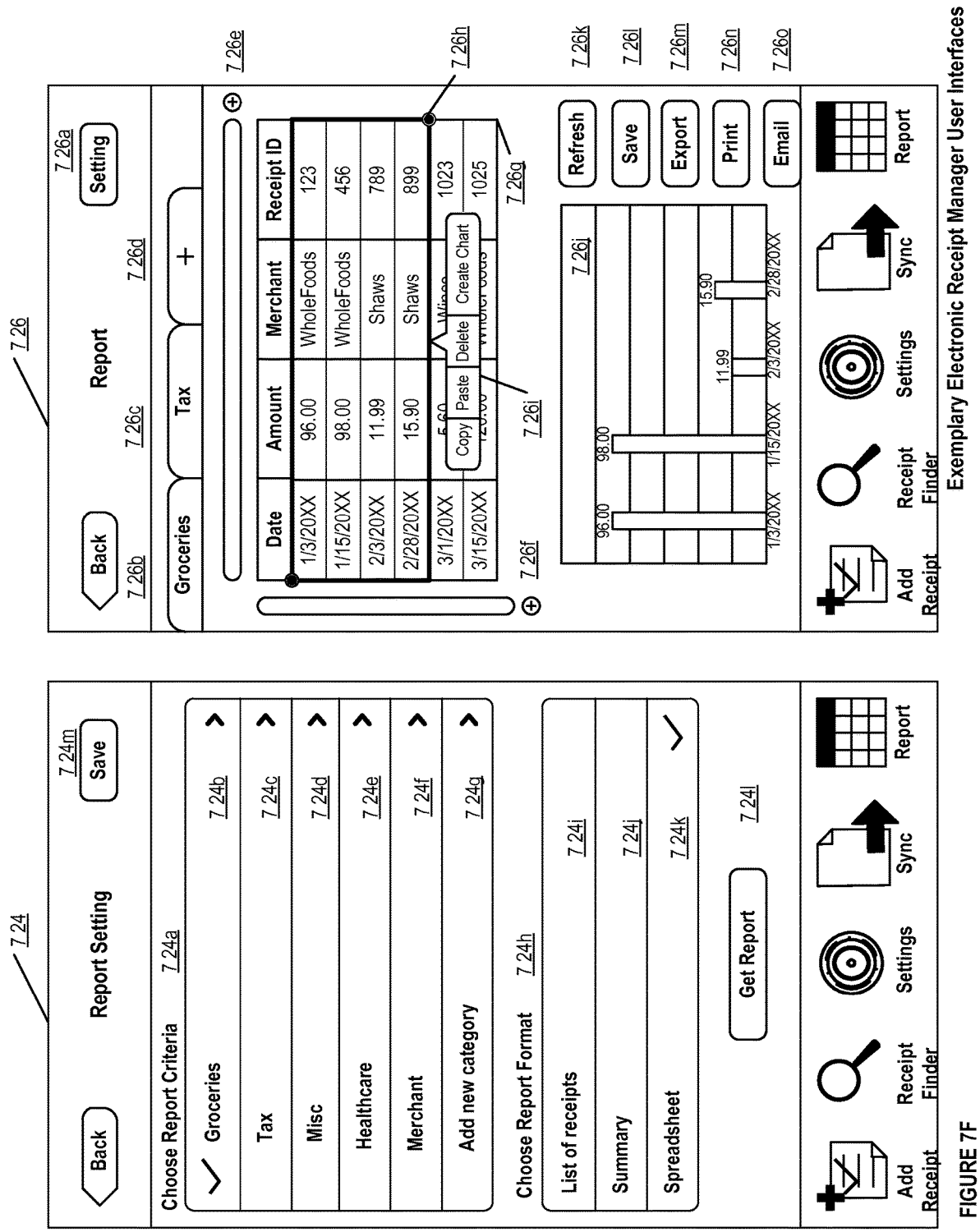

Referring to FIG. 7F, UI 724 and 725 associated with the report tab icon 745 illustrate various options for report generation in the RM application. In one implementation, UI 724 may provide an option 724*a* to choose report criteria. These options may include, for example, groceries 724*b*, tax 724*c*, miscellaneous 724*d*, healthcare 724*e*, merchant 724*f*, and/or the like, as well as an option to add a new category 724*g*. The UI may also provide an option 724*h* to choose a report format. Examples of report format may include, a listing 724*i*, a summary format 724*j*, a spreadsheet format 724*k*, and/or the like. In a further implementation, default report templates may be provided for selection by the user. The user may modify a default report template and save the modified template as a new template. In one implementation, the user may also add custom templates (e.g., custom expense report template) to the report format. In a further implementation, copies of the templates may be maintained at the cloud server such that the user does not need to save them in the memory of his or her portable device. In one implementation, the listing 724*i* may be a listing of receipts by receipt identifier with a link or an icon that directs the user to the receipt. The summary format 724*j* may be a summary listing such as the one shown in UI 714 (FIG. 7C) and item 800 (FIG. 8A). The spreadsheet format 724*k* may be a table format such as UI 726. The UI may also include a get report button 7241 that causes the RM application to obtain or generate a report in the user-specified format including receipt data matching the user-specified reporting criteria. The report settings thus configured may be saved by selecting the save button 724*m* on the navigation bar.

When the get report button 7241 is selected from UI 724, the RM application may display UI 726. UI 726, as shown, may include a tab for each reporting criteria selected. For example, as groceries criterion 724*b* is selected in UI 724, a groceries tab 726*b* may be displayed. The user may also add additional reporting criteria directly from UI 726 by selecting the tab 726*d*. As shown, a tax tab 726*c* has been added from UI 726. Each tab, may include a table 726*g* including fields customized by the user (e.g., using UI 722, FIG. 7E). The table may include options to add a column or row by selecting an add column icon 726*e* or an add row icon 726*f*. In one implementation, the user may select a data field for the new column or row and select refresh button 726*k* to obtain data pertaining to the just added data field. The table may also include options to select a cell or a group of cells as shown by a selection box 726*h*. In one implementation, when a selection box is drawn, a menu option 726*i* may be displayed. The menu option 726*i* may include options to copy, cut, paste, delete, merge, fill, format, create chart, and/or the like. When the create chart option is selected, a chart option menu (not shown) may be displayed. The user may select a suitable chart type (e.g., bar, column, pie, and/or the like) and a chart such as chart 726*j* may be displayed. The underlying data for the chart may be derived from the data in the selection area 726*h*. In one implementation, the user may select a save button 726*l* to save the table and chart, an export button 726*m* to export the table and/or chart to another application or as a file (e.g., PDF, Excel, text, and/or the like), a print button 726*n* to print the table and/or chart, an email button 726*o* to email the report to one or more recipients, and/or the like.

As discussed previously, users may use the reporting facilities of the RM application to request various reports generated in a selected format or using a template. Such reports may be useful for various purposes, including management, tracking, and record keeping of personal finances, business expenses, budgeting, and/or the like. For example, in one implementation, a user may desire to obtain a report for all education related transactions conducted in the previous year. In situations where education related expenses may have tax benefits or be tax deductible, the report may be used to ascertain applicable tax credits, and the receipts for such transactions may be available for any tax audits. In another implementation, the reporting facilities of the ERM may assist in the preparation of expense reports for reimbursement, insurance claim reports, and/or the like. For example, in one implementation, a user may retrieve receipts that are categorized under work expenses and generate an expense report (e.g., using a default template or custom template accepted and/or approved by an employer). In some implementations, the user may retrieve receipts for all transactions conducted during a business trip (e.g., using search parameters such as date range, geographic location, and/or the like). They user may then deselect any receipts that the user may not wish to be reimbursed for, generate a report in a desired format and/or template, add notes or comments and send the report to desired recipients. In one implementation, the RM application may be integrated with applications such as tax preparation software, human resources software, and/or the like to allow effective importing/exporting of receipt and/or transaction data and reports.

FIG. 8A shows a screenshot diagram illustrating an exemplary RM application user interface in some embodiments of the ERM. As shown, the RM application UI 800 provides columns including fields reflecting the user's selectable preferences for receipt information along with a receipt identifier column. For example, these selectable fields may include the date of the purchase, the amount of the purchase, the merchant where the purchase was made and return period. The aforementioned fields are shown only as an example and any information included on the receipt may be utilized to form a field. If information relating to a field is not provided within a particular electronic receipt, the field may be left blank or may include an indication (e.g., N/A) that the information was not provided in the receipt.

In addition to receipt information, the RM application may include additional functionality, such as actions which may be performed on the receipt. For example, the user may print the listing of receipts and/or an individual receipt through selection of a printer icon 804. The user may interface the portable device with a computer (not shown) in communication with a printer or wirelessly, such as through a WLAN to a printer. In one embodiment, when the user selects the printer icon 804 to print the listing of receipts, the user may be prompted to re-select the formatting of the receipts. For example, it may be that due to the size of the display on the portable device, the user may only include four fields of information for the receipts displayed thereon. However, when printing, the user may wish to include additional fields of receipt information.

As shown in FIG. 8A, the user may also select to transmit, such as by text message or email 806 the receipt and/or listing of receipts to a recipient or delete 810 the receipt(s). In one embodiment, the user may select (e.g., highlight) 802 individual receipts or multiple receipts to perform any of the functions 804, 806 and 808. In another embodiment, with no selection of receipts by the user, the application may print, email or delete the displayed listing (e.g. all or at least more than one) of the receipts. The RM application UI 800 may also include an exit 810 function, which allows a user to exit the application. In another embodiment, as discussed with reference to FIG. 7C, the RM may include a search function (not shown), which allows a user to enter a portion of information found in a selectable field to locate a receipt. For example, the search function may automatically provide the user with a text field to enter the receipt identifier number, a merchant name, date, and/or the like The RM may return a listing of receipts meeting that criteria.

When a user is viewing the listing of receipts in the RM application UI 800, the user may select a particular receipt for viewing. As shown in FIG. 8A, only preferred fields may be shown. However, a user may also wish to view the original receipt in order to review particular item costs, and/or the like Accordingly, the user may select a listed receipt 802, and the identifier (i.e., the identifier associated with the receipt 802) is utilized to retrieve the original receipt from the portable device memory (or from the cloud server) and display the original receipt to the user.

FIG. 8B shows a screenshot diagram illustrating an exemplary original receipt in some embodiments of the ERM. The original receipt 805 may be in any format which was provided by the merchant and may include information such as the merchant name, address, store number, date/time, product details in the transaction, and/or the like. In one implementation, the receipt may be converted to a standard format (e.g., images may be converted to PDF for text recognition). In one implementation, receipts may be processed using optical character recognition (OCR) in order to extract data from the receipts. The receipt may include an identifier 812, which may be generated by the receipt identifier generation engine 154 discussed in reference to FIG. 1B. While viewing the original receipt 805, the user may still have the options of printing 816, emailing 818 and deleting 820 the receipt 805. Additionally, the user may have the option to return 814 to the previous display 800 (e.g., menu), including the listing of receipts.

FIG. 8C shows a screenshot diagram illustrating an exemplary account statement in some embodiments of the ERM. In addition to being able to view the receipt in the RM, the user may decide to delete receipts frequently and/or rely on the issuer and/or CCA of an account to additionally maintain receipt data. In such a case, the RM application may be programmed with instructions to forward receipt related data and/or a copy of the original receipt to the account issuer and/or CCA when an electronic receipt is received on the portable device. In some implementations, as discussed with respect to FIGS. 2A and 4, receipt and/or receipt data may be synced to the cloud server and the cloud server may share the receipt data (e.g., receipt identifier) with the issuer and/or CCA. The receipt data can include a hyperlink of the identifier 822 generated on the portable device. In one implementation, as previously discussed, the identifier may be generated by the cloud server or the TPS server. Accordingly, when a user views an account statement 815 the hyperlink may be utilized to retrieve a copy of the original receipt (e.g., from local memory or database associated with the cloud server) and to display that copy to the user.

In another embodiment, if the user is viewing the account statement 815 on the portable device, the identifier 822 hyperlink may be used to call the original receipt from the memory of the portable device for viewing or to run the receipt application and display a listing of receipts, highlighting the selected receipt. In an alternative embodiment, the identifier 822 on the account statement 815 may be generated by the CCA or issuer of the account and may differ from the identifier created on the user's portable device. In some embodiments, an icon may be provided in place of an identifier.

As previously described, the receipt identifier generated on the receipt identifier generation engine 154 by the user's portable device 100 may be appended to the original receipt and utilized in the user's account statement for cross-referencing with the receipts in the RM application illustrated in FIG. 8A. The identifier may be used in the statement to call a local copy of the receipt for viewing, such as in the case where the user accesses his or her account statement (e.g., VISA) via his or her portable device. In another embodiment, the identifier may be used to view the receipt in another browser window, such as when the copy is stored by the issuer and/or CCA or in a cloud.

In one embodiment, the account issuer or CCA may also include a receipt identifier generation engine, which may assign a new receipt identifier to the receipt for accessing the receipt from the user's statement. In some embodiments, the user's RM application may automatically insert the identifier generated on the portable device into the copy of the original receipt forwarded to the issuer and/or CCA, or synced with the cloud server. This may aid the user in finding the receipt more easily on his or her portable device through the RM application.

Figure 8E:
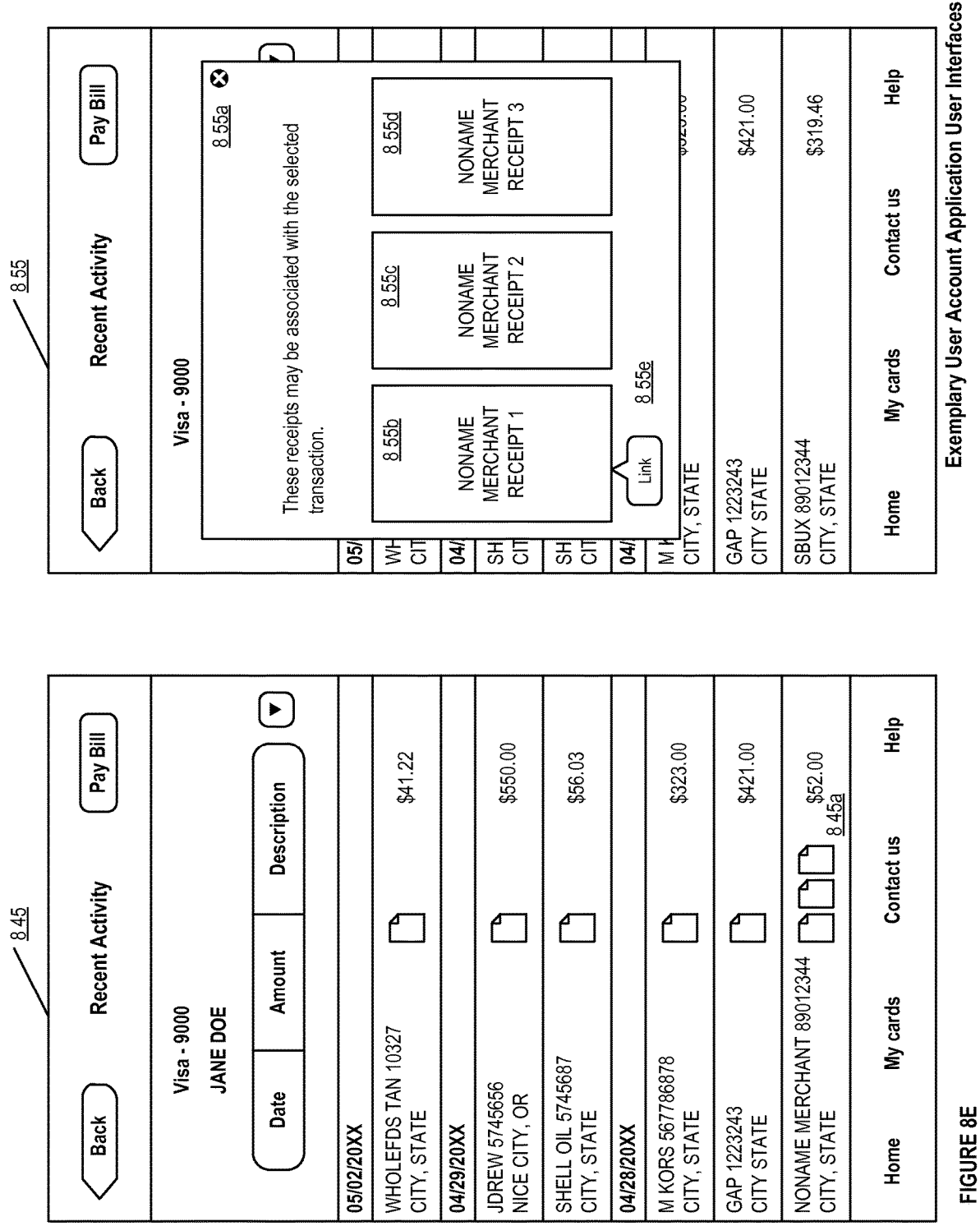

FIGS. 8D-E show screenshot diagram illustrating exemplary user account application in some embodiments of the ERM. As shown, UI 825 and 835 illustrate example user interfaces of a user account with a TPS server (e.g., an issuer, a CCA, merchants that issue payment cards, and/or the like) that is synced to the user's portable device and/or cloud server as discussed previously. In one implementation, UI 825 may display payment and user information 825*a*, fields of transaction information 825*b* (e.g., date, amount, description) a sorting option 825*c*, and/or the like. For example, recent transaction details may be listed in the display area of the UI. Each transaction may be identified by a transaction date 825*d*, merchant information (e.g., name, city, state, phone number, and/or the like) 825*e*, an icon or link 825*f* for a receipt for the transaction, a transaction amount 825*g*, and/or the like. When the receipt icon 825*f* is selected, UI 835 may be displayed. As shown, the UI may include an overlay 835*a* in which the receipt 835*b* associated with the selected icon may be displayed. The overlay may also include options to print 835*c*, save 835*d*, email 835*e*, and/or the like. The user may simply close the overlay 835*a* to return back to UI 825.

Referring to FIG. 8E, in one implementation, a UI 845 may be displayed when the user accesses his or her account. As shown, a number of receipt icons 845*a* may be displayed next to a transaction. Such a situation may occur when there is incomplete data to definitively associate a receipt to a transaction. These icons may include receipts that are most likely related to the transaction. When any one of the icons 845*a* is selected, UI 855 may be displayed to the user. As shown, the UI may include an overlay 855*a* that may display all three receipts 855*b*, 855*c* and 855*d* that are most likely associated with the transaction. In one implementation, the user may review the receipts and select a receipt to link it to the transaction. As shown, when the user selects receipt 855*b*, a link option 855*e* may pop up. The user may select the link option to link the receipt to the transaction. In one implementation, the user may be requested to confirm the linking, at which time, the user may either confirm or cancel the linking.

In light of the aforementioned detailed description, it should be noted that various aspects of the ERM may allow a user to view, maintain, organize and manage receipts. Additionally, facilities of the ERM allow users to effectively manage their financing of accounts used in a transaction through effective and quick viewing of receipts associated with those transactions. As discussed, various aspects of the ERM include a centralized cloud storage server where receipts are stored, and receipt identifiers that are shared among users, issuers, other TPS server entities, and/or the like. Such facilities of the ERM may reduce redundancy of data stored at such entities. Additionally, as receipts are synced to the cloud server, and may be efficiently retrieved using receipt identifiers or queries, receipts need not be stored locally in the portable device and memory in the portable device may be made available for other purposes.

Furthermore, in some embodiments, ERM may act as a receipt aggregator, aggregating receipts from all transactions (e.g., at PoS terminal, online, device to device, and/or the like), regardless of the payment form (e.g., credit, debit, prepaid, cash, check, and/or the like), and providing users access to aggregate transaction data. Such aggregate transaction data may be used to generate various reports and perform analyses on spending. For example, users may configure the RM application to track spending on one or more desired criteria (e.g., clothing merchandize, healthcare, month, and/or the like) and alert the user upon or prior to reaching a user-specified threshold (e.g., $500 dollars per month, $5000 deductible). Such aggregation facilities reduce the number of actions required to generate reports and perform analyses on aggregate transaction data.

ERM Controller

Figure 9:
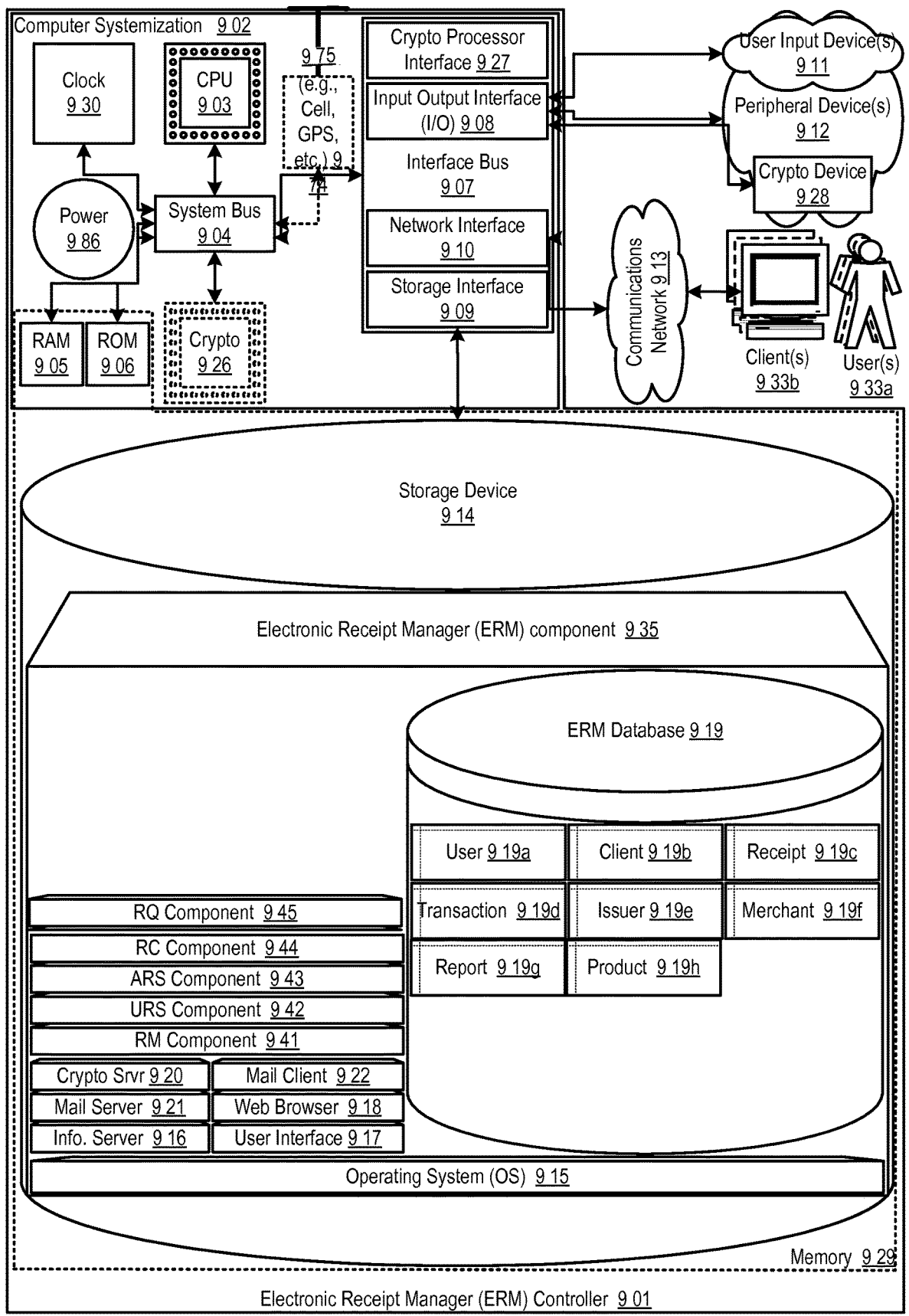
FIG. 9 shows a block diagram illustrating example aspects of an ERM controller.

FIG. 9 shows a block diagram illustrating example aspects of a ERM controller 901. In this embodiment, the ERM controller 901 may serve to aggregate, process, store, search, serve, identify, instruct, generate, match, and/or facilitate interactions with a computer through various technologies, and/or other related data.

Users, e.g., 933*a*, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer, memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ERM controller 901 may be connected to and/or communicate with entities such as, but not limited to: one or more users from user input devices 911; peripheral devices 912; an optional cryptographic processor device 928; and/or a communications network 913. For example, the ERM controller 901 may be connected to and/or communicate with users, e.g., 933*a*, operating client device(s), e.g., 933*b*, including, but not limited to, personal computer(s), server(s) and/or various mobile device(s) including, but not limited to, cellular telephone(s), smartphone(s) (e.g., iPhone4, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ERM controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeably throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing ERM controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA (2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the ERM controller and beyond through various interfaces. Should processing requirements dictate a greater amount speed and/or capacity, distributed processors (e.g., Distributed ERM), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the ERM may be achieved by implementing a microcontroller such as CAST's R8051XC2 microcontroller; Intel's MCS 51 (i.e., 8051 microcontroller); and/or the like. Also, to implement certain features of the ERM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ERM component collection (distributed or otherwise) and/or features may be implemented via the microprocessor and/or via embedded components; e.g., via ASIC, coprocessor, DSP, FPGA, and/or the like. Alternately, some implementations of the ERM may be implemented with embedded components that are configured and used to achieve a variety of features or signal processing.

Depending on the particular implementation, the embedded components may include software solutions, hardware solutions, and/or some combination of both hardware/software solutions. For example, ERM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ERM features. A hierarchy of programmable interconnects allow logic blocks to be interconnected as needed by the ERM system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the ERM may be developed on regular FPGAs and then migrated into a fixed version that more resembles ASIC implementations. Alternate or coordinating implementations may migrate ERM controller features to a final ASIC instead of or in addition to FPGAs. Depending on the implementation all of the aforementioned embedded components and microprocessors may be considered the "CPU" and/or "processor" for the ERM.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the ERM thereby providing an electric current to all the interconnected components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, frequently, although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 910 may accept, communicate, and/or connect to a communications network 913. Through a communications network 913, the ERM controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed ERM), architectures may similarly be employed to pool, load balance, and/or otherwise increase the communicative bandwidth required by the ERM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the ERM controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the ERM controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the ERM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the ERM controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 929 may include ROM 906, RAM 905, and a storage device 914. A storage device 914 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the ERM component(s) 935; and/or the like (i.e., collectively a component collection). These components may be stored and accessed from the storage devices and/or from storage devices accessible through an interface bus. Although non-conventional program components such as those in the component collection may be stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the ERM controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ERM controller to communicate with other entities through a communications network 913. Various communication protocols may be used by the ERM controller as a subcarrier transport mechanism for interaction, such as, but not limited to: multicast, TCP/IP, UDP, unicast, and/or the like.

Information Server

An information server component 916 is a stored program component that is executed by a CPU. The information server may be an Internet information server such as, but not limited to Apache Software Foundation's Apache, Microsoft's Internet Information Server, and/or the like. The information server may allow for the execution of, program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ERM controller based on the remainder of the HTTP request. For example, a request such as http://123.124.125.126/myInformation-.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ERM database 919, operating systems, other program components, user interfaces, Web browsers, and/or the like.

Access to the ERM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ERM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ERM as a query. Upon generating query results from the query, the results are passed over the bridge mechanism, and may be parsed for formatting and generation oft a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/ Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc.

interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a hypertext viewing application such as Google's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the ERM equipped nodes. The combined application may be nugatory on systems employing standard Web browsers.

Mail Server

A mail server component 921 is a stored program component that is executed by a CPU 903. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ERM.

Access to the ERM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES). Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ERM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ERM component to engage in secure transactions if so desired. The cryptographic component facilitates the secure accessing of resources on the ERM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ERM Database

The ERM database component 919 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ERM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ERM database is implemented as a data-structure, the use of the ERM database 919 may be integrated into another component such as the ERM component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-h. A Users table 919a may include fields such as, but not limited to: user_id, ssn, dob, first_name, last_name, age, state, address_firstline, address_secondline, zipcode, devices_list, contact_info, contact_type, alt_contact_info, alt_contact_type, email address, password, enrollment status, report_ID, report preference, preference and/or the like. The Users table may support and/or track multiple entity accounts on a ERM. A Clients table 919b may include fields such as, but not limited to: client_ID, user_ID, client_name, client_IP, client_GPS, client_MAC, client_serial, client_ECID, client_UDID, client_browser, client_type, client_model, client_version, client_OS, client_apps_list, client_securekey, and/or the like. A Receipt table 919c may include fields such as, but not limited to: receipt_ID, user_receipt_ID, receipt_path, merchant_transaction_ID, processor_transaction_ID, transaction date, merchant_ID, purchase category, payment card, receipt amount, return eligibility expiry date, return eligibility status date, and/or the like. A Transaction table 919d may include fields such as, but not limited to: merchant_transaction_ID, TPS_transaction_ID, transaction date, transaction amount, product ID, receipt_ID, and/or the like. An Issuer table 919e may include fields such as, but not limited to: issuer_ID, issuer name, issuer address, user_ID, username, password, and/or the like. A Merchant table 919f may include fields such as, but not limited to: merchant_ID, merchant name, merchant address, merchant category code, merchant receipt delivery method, and/or the like. A Report table 919g may include fields such as, but not limited to: report_ID, report format, report type, report criteria, and/or the like. A Product table 919h may include fields such as, but not limited to: product_ID, product SKU, product name, product mode, price, and/or the like. In one embodiment, the ERM database may interact with other database systems. For example, employing a distributed database system, queries and data access by search ERM component may treat the combination of the ERM database, an integrated data security layer database as a single database entity.

In one embodiment, user programs may contain various user interface primitives, which may serve to update the ERM. Also, various accounts may require custom database tables depending upon the environments and the types of clients the ERM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-h. The ERM may be configured to keep track of various settings, inputs, and parameters via database controllers.

The ERM database may communicate to and/or with other components in a component collection, including itself, and/or facilities of the like. Most frequently, the ERM database communicates with the ERM component, other program components, and/or the like. The database may contain, retain, and provide information regarding other nodes and data.

The ERMs

The ERM component 935 is a stored program component that is executed by a CPU. In one embodiment, the ERM component incorporates any and/or all combinations of the aspects of the ERM discussed in the previous figures. As such, the ERM affects accessing, obtaining and the provision of information, services, transactions, and/or the like across various communications networks. The features and embodiments of the ERM discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the ERM's features and facilities, and in many cases reduce the costs, energy consumption/requirements, and extend the life of ERM's underlying infrastructure; this has the added benefit of making the ERM more reliable. Similarly, many of the features and mechanisms are designed to be easier for users to use and access, thereby broadening the audience that may enjoy/employ and exploit the feature sets of the ERM such ease of use also helps to increase the reliability of the ERM. In addition, the feature sets include heightened security as noted via the Cryptographic components 920, 926, 928 and throughout, making access to the features and data more reliable and secure.

The ERM component may transform transaction initiation requests and receipt requests via ERM components into receipt formatting, organization, storage and linkage with transactions, and/or like use of: the ERM. In one embodiment, the ERM component 935 takes inputs (e.g., payment input 202a, add receipt to RM application input 214, account login detail input 250, select view receipt input 260; and/or the like) etc., and transforms the inputs via various components (e.g., RM component 941, URS component 942, ARS component 943, RC component 944, RQ component 945; and/or the like), into outputs (e.g., purchase request 202b, transaction authorization request message 204, transaction authorization response message 208, receipt 210, receipt sync request 216, receipt sync confirmation message 222, receipt identifier and transaction details message 226, user authentication request message 252, user authentication response message 256, receipt request message 262a, 264a, 262b, receipt response message 264a, 264b, receipt query 268, receipt 272, receipt data 274; and/or the like).

The ERM component enabling access of; information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the ERM server employs a cryptographic server to encrypt and decrypt communications. The ERM component may communicate to and/or with other components in a component collection, including itself, and/or facilities of the like. Most frequently, the ERM component communicates with the ERM database, operating systems, other program components, and/or the like. The ERM may contain, communicate, generate, obtain, and/or provide program component, system, user, and/or data communications, requests, and/or responses.

Distributed ERMs

The structure and/or operation of any of the ERM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ERM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ERM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password);
// access database server
mysql_select("CLIENT_DB.SQL"); // select database to append
mysql_query("INSERT INTO UserTable (transmission)
```

-continued

```
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein.

In order to address various issues and advance the art, the entirety oft this application for ELECTRONIC RECEIPT MANAGER APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ERM individual and/or enterprise user, database configuration and/or relational model, data type, data transmission and/or network framework, syntax structure, and/or the like, various embodiments of the ERM may be implemented that allow a great deal of flexibility and customization. For example, aspects of the ERM may be adapted for finance management. While various embodiments and discussions of the ERM have been directed to managing, organizing and viewing receipts, however, it is to be understood that the embodiments described herein may be readily configured and/or customized for a wide variety of other applications and/or implementations.

What is claimed is:

1. A processor-implemented method for managing receipts on a cloud storage system, comprising the steps of:
  receiving a sync receipt request from a portable device, wherein the sync receipt request includes a receipt having a plurality of receipt parameters and custom report parameters;
  parsing the sync receipt request to obtain the receipt and the custom report parameters;
  storing the receipt in a receipt database;
  executing a query on the receipt database using at least one query parameter received from the portable device;
  obtaining query results comprising report data that includes receipts having receipt parameters that match the at least one query parameter;
  extracting custom report parameter values from the receipts returned in the query results using the custom report parameters; and
  sending the report data including the custom report parameter values to the portable device;
  wherein the report data is formatted into a receipt history report having a set of fields comprising the custom report parameters, and wherein the set of fields are determined based on at least one of a display size and capacity of a memory element of the portable device.

2. The method of claim 1, further comprising:
  sending a receipt sync confirmation message to the portable device upon storage of the receipt into the receipt database.

3. The method of claim 1, wherein the portable device includes an interface, and wherein the receipt history report is displayed on the interface.

4. The method of claim 1, wherein the set of fields are selected by a user using an interface of the portable device.

5. The method of claim 1, wherein the set of fields includes a return eligibility indicator that indicates whether one or more products associated with the receipt is eligible for return.

6. The method of claim 1, wherein the portable device receives a request from a user to display a new field that is available but was not selected according to a user preference selection, the method further comprising the step of:
  transmitting data for the new field to the portable device, wherein the report data is reformatted to display the new field in the receipt history report.

7. The method of claim 1, further comprising the steps of:
  generating a unique receipt identifier for the receipt; and
  storing the unique receipt identifier in the receipt database.

8. The method of claim 7, wherein the receipt is for a transaction conducted on an account issued by an issuer, the method further comprising the step of:
  sending a copy of the receipt to the issuer of the account.

9. The method of claim 7, wherein the receipt is for a transaction conducted on an account issued by an issuer, the method further comprising the step of:
  sending the unique receipt identifier to the issuer of the account.

10. The method of claim 9, wherein the unique receipt identifier is linked to a corresponding transaction on the account at the issuer such that the receipt for the transaction is accessible to the user of the account from a user interface for management of the account maintained by the issuer.

11. The method of claim 1, further comprising the steps of:
  receiving a receipt search request including at least one search parameter from the portable device;
  querying the receipt database based on the at least one search parameter; and
  sending a receipt that matches the at least one search parameter to the portable device.

12. The method of claim 11, wherein the at least one search parameter is selected from a group consisting of transaction date, merchant, purchase category, payment card and receipt identifier.

13. A processor-readable tangible non-transitory medium storing processor-issuable instructions configured to cause a processor to:
  receive a sync receipt request from a portable device, wherein the sync receipt request includes a receipt having a plurality of receipt parameters and custom report parameters;
  parse the sync receipt request to obtain the receipt and the custom report parameters;
  store the receipt in a receipt database;
  execute a query on the receipt database using at least one query parameter received from the portable device;
  obtain query results comprising report data that includes receipts having receipt parameters that match the at least one query parameter;
  extract custom report parameter values from the receipts returned in the query results using the custom report parameters; and
  send the report data including the custom report parameter values to the portable device;
  wherein the report data is formatted into a receipt history report having a set of fields comprising the custom report parameters, and wherein the set of fields are determined based on at least one of a display size and capacity of a memory element of the portable device.

14. The processor-readable tangible non-transitory medium of claim 13, further comprising instructions configured to cause a processor to:
  generate a unique receipt identifier for the receipt; and
  store the unique receipt identifier in the receipt database.

15. The processor-readable tangible non-transitory medium of claim 14, wherein the receipt is for a transaction conducted on an account issued by an issuer, further comprising instructions configured to cause a processor to:

send the unique receipt identifier to the issuer of the account.

16. The processor-readable tangible non-transitory medium of claim 15, wherein the unique receipt identifier is linked to a corresponding transaction on the account at the issuer such that the receipt for the transaction is accessible to the user of the account from a user interface for management of the account maintained by the issuer.

17. The processor-readable tangible non-transitory medium of claim 13, further comprising instructions configured to cause a processor to:
receive a receipt search request including at least one search parameter from the portable device;
query the receipt database based on the at least one search parameter; and
send a receipt that matches the at least one search parameter to the portable device.

18. The processor-readable tangible non-transitory medium of claim 17, wherein the at least one search parameter is selected from a group consisting of transaction date, merchant, purchase category, payment card and receipt identifier.

19. An electronic receipt manager system, comprising:
a portable device having an input interface configured to receive an electronic receipt and custom report parameters through an input device of the portable device, the custom report parameters specifying one or more of the plurality of receipt parameters; and
a cloud storage system in communication with the portable device and associated with a receipt database; and
wherein the cloud storage system is configured to:
receive a sync receipt request message from the portable device;
parse the sync receipt request message to obtain the electronic receipt and the custom report parameters;
store the electronic receipt in the receipt database;
generate a receipt identifier for the electronic receipt;
store the electronic receipt in association with the receipt identifier in the receipt database;
execute a query on the receipt database using at least one query parameter received from the portable device;
obtain query results comprising report data that includes receipts having receipt parameters that match the at least one query parameter;
extract custom report parameter values from the receipts returned in the query results using the custom report parameters; and
send the report data including the custom report parameter values and receipt identifiers to the portable device, wherein the report data is formatted into a receipt history report having a set of fields comprising the custom report parameters, and wherein the set of fields are determined based on at least one of a display size and capacity of a memory element of the portable device.

* * * * *